(12) United States Patent
Damnjanovic et al.

(10) Patent No.: US 8,310,981 B2
(45) Date of Patent: Nov. 13, 2012

(54) COMMON AND DEDICATED MODULATION AND CODING SCHEME FOR A MULTICARRIER SYSTEM

(75) Inventors: Jelena M. Damnjanovic, Del Mar, CA (US); Juan Montojo, San Diego, CA (US); Amir Farajidana, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 410 days.

(21) Appl. No.: 12/603,426

(22) Filed: Oct. 21, 2009

(65) Prior Publication Data

US 2010/0103920 A1  Apr. 29, 2010

Related U.S. Application Data

(60) Provisional application No. 61/107,608, filed on Oct. 22, 2008, provisional application No. 61/107,584, filed on Oct. 22, 2008.

(51) Int. Cl.
*H04B 7/204* (2006.01)
(52) U.S. Cl. ....................................................... 370/319
(58) Field of Classification Search .................. None
See application file for complete search history.

(56) References Cited

U.S. PATENT DOCUMENTS

| 7,876,808 | B2* | 1/2011 | Catreux-Erceg et al. ...... 375/140 |
| 7,881,247 | B2* | 2/2011 | Pan et al. ....................... 370/319 |
| 2007/0097915 | A1 | 5/2007 | Papasakellariou |
| 2008/0253326 | A1* | 10/2008 | Damnjanovic ................ 370/329 |
| 2010/0097976 | A1* | 4/2010 | Agrawal et al. ............... 370/315 |

FOREIGN PATENT DOCUMENTS

| EP | 1898540 | 3/2008 |
| EP | 1901496 | 3/2008 |
| EP | 2120378 | 11/2009 |
| WO | WO2006010027 | 1/2006 |
| WO | WO2008096647 | 8/2008 |
| WO | WO2008109269 | 9/2008 |

OTHER PUBLICATIONS

International Search Report and Written Opinion—PCT/US2009/061711, International Search Authority—European Patent Office—Oct. 18, 2010.

* cited by examiner

*Primary Examiner* — Chi H Pham
*Assistant Examiner* — Fan Ng
(74) *Attorney, Agent, or Firm* — Qualcomm Patent Group; Paul Kuo

(57) ABSTRACT

A method, an apparatus, and a computer program product for wireless communication are provided in which at least one modulation and coding scheme (MCS) is determined based on feedback received for a plurality of downlink (DL) carriers and transmitted from a device. Data is modulated and coded, according to the at least one MCS, for transmission to the device on the DL carriers.

54 Claims, 22 Drawing Sheets

US 8,310,981 B2

COMMON AND DEDICATED MODULATION AND CODING SCHEME FOR A MULTICARRIER SYSTEM

CROSS-REFERENCE TO RELATED APPLICATION(S)

Pursuant to 35 U.S.C. §119(e), this application claims the benefit of U.S. Provisional Application Ser. No. 61/107,608 filed on Oct. 22, 2008, and the benefit of U.S. Provisional Application Ser. No. 61/107,584 filed on Oct. 22, 2008, the contents of which are hereby incorporated by reference herein in their entirety.

BACKGROUND

1. Field

The present disclosure relates generally to communications, and more particularly, to a common and a dedicated modulation and coding scheme (MCS) for a multicarrier system.

2. Background

Wireless communication systems are widely deployed to provide various telecommunication services such as telephony, video, data, messaging, and broadcasts. Typical wireless communication systems may be multiple-access systems capable of supporting communication with multiple users by sharing available system resources (e.g., bandwidth, transmit power). Examples of such multiple-access systems include code division multiple access (CDMA) systems, time division multiple access (TDMA) systems, frequency division multiple access (FDMA) systems, orthogonal frequency division multiple access (OFDMA) systems, and single-carrier frequency divisional multiple access (SC-FDMA) systems. The systems can conform to specifications of the Third Generation Partnership Project (3GPP), such as, for example, 3GPP Long Term Evolution (LTE). LTE is a set of enhancements to the Universal Mobile Telecommunications System (UMTS) mobile standard in order to improve spectral efficiency, lower costs, improve services, make use of new spectrum, and better integrate with other open standards.

Generally, wireless multiple-access communication systems may simultaneously support communication for multiple user equipment (UE). Each UE may communicate with a base station (BS) via transmissions on forward and reverse links. The forward link (or downlink (DL)) refers to the communication link from the BSs to UEs, and the reverse link (or uplink (UL)) refers to the communication link from UEs to the BSs. Communications between UEs and BSs may be established via single-input single-output (SISO) systems, single-input multiple-output (SIMO) systems, multiple-input single-output (MISO) systems, multiple-input multiple-output (MIMO) systems. UEs can communicate with other UEs (and/or BSs with other BSs) in peer-to-peer wireless network configurations.

SUMMARY

In an aspect of the disclosure, a method, an apparatus, and a computer program product for wireless communication are provided in which at least one modulation and coding scheme (MCS) is determined based on feedback received for a plurality of DL carriers and transmitted from a device. Data is modulated and coded, according to the at least one MCS, for transmission to the device on the DL carriers.

In an aspect of the disclosure, a method, an apparatus, and a computer program product for wireless communication are provided in which a signal is received from a device in at least one uplink carrier. The at least one uplink carrier includes a plurality of uplink carriers or one uplink carrier containing N single-carrier frequency division multiple access transmissions, where N≧2. A channel quality of the received signal is determined. At least one modulation and coding scheme is determined based on the determined channel quality. Data are demodulated and decoded in the at least one uplink carrier from the device according to the at least one modulation and coding scheme.

In an aspect of the disclosure, a method, an apparatus, and a computer program product for wireless communication are provided in which feedback is sent for a plurality downlink carriers. Information is received on at least one modulation and coding scheme determined based on the feedback. Data received on the downlink carriers are demodulated and decoded according to the information.

In an aspect of the disclosure, a method, an apparatus, and a computer program product for wireless communication are provided in which a signal is sent on at least one uplink carrier. The at least one uplink carrier includes a plurality of uplink carriers or one uplink carrier containing N single-carrier frequency division multiple access transmissions, where N≧2. Information is received on at least one modulation and coding scheme determined based on a channel quality of the signal. Data, for transmission in the at least one uplink carrier, are modulated and coded according to the information.

DETAILED DESCRIPTION

Figure 1:
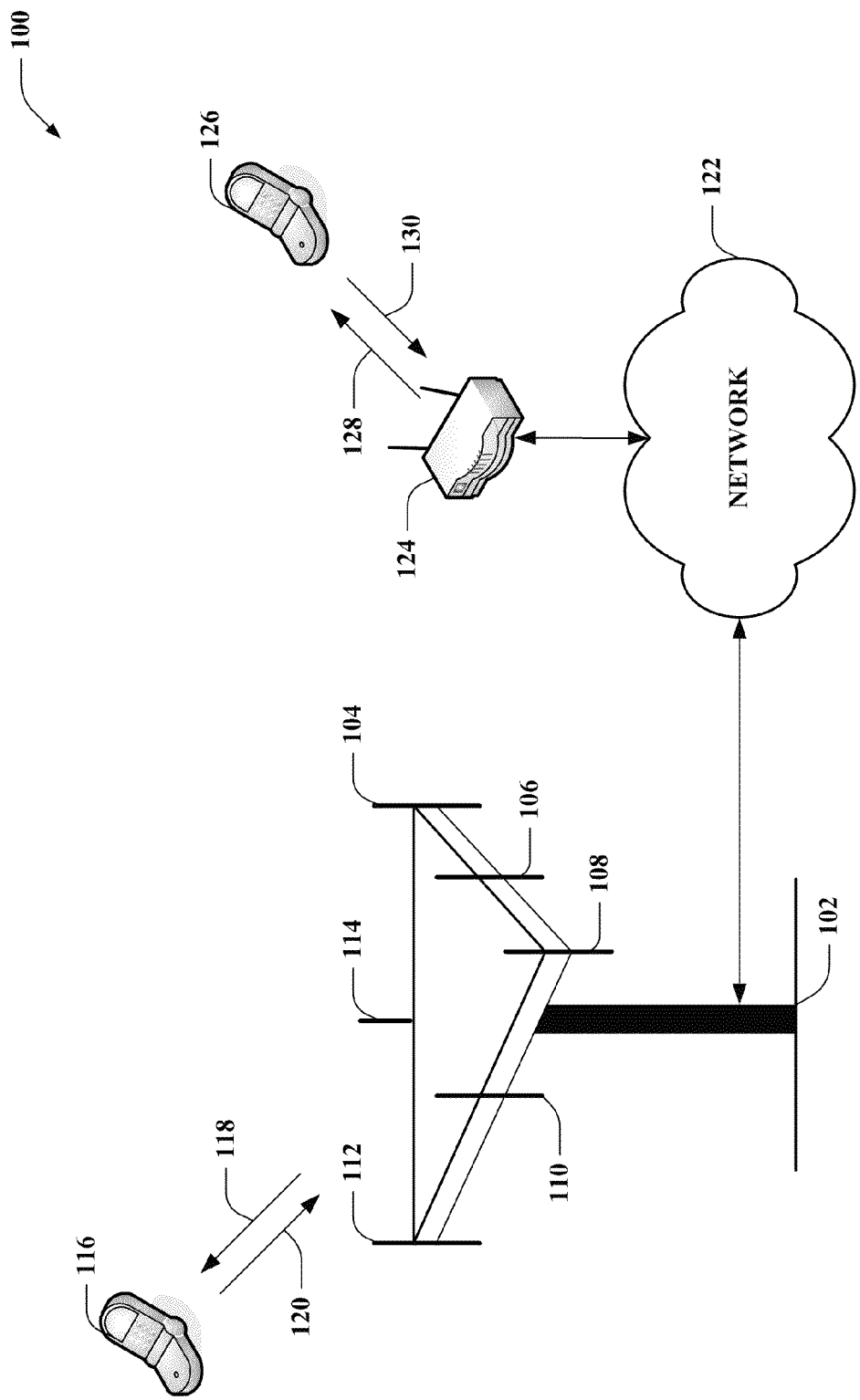
FIG. 1 is an illustration of a wireless communication system.

In the following description, for purposes of explanation, numerous specific details are set forth in-order to provide a thorough understanding of one or more embodiments. It may be evident, however, that such embodiment(s) can be practiced without these specific details. In other instances, well-known structures and devices are shown in block diagram form in-order to facilitate describing one or more embodiments.

As used in this application, the terms "component," "module," and "system" are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a UE. A UE can also be called a mobile device, system, subscriber unit, subscriber station, mobile station, mobile, remote station, remote terminal, access terminal, user terminal, terminal, wireless communication device, user agent, user device, or device. Various embodiments are described herein in connection with a base station. A BS can be utilized for communicating with UEs and can also be referred to as an access point, Node B, evolved Node B (eNode B or eNB), base transceiver station (BTS), or some other terminology.

Moreover, various aspects or features described herein can be implemented as a method, apparatus, or article of manufacture using standard programming and/or engineering techniques. The term "article of manufacture" as used herein is intended to encompass a computer program accessible from any machine-readable device, carrier, or media. Machine-readable media can include but are not limited to magnetic storage devices (e.g., hard disk, floppy disk, magnetic strips), optical disks (e.g., compact disk (CD), digital versatile disk (DVD)), smart cards, flash memory devices (e.g., EPROM, card, stick, key drive), random access memory (RAM), a read only memory (ROM), a programmable ROM (PROM), an erasable PROM (EPROM), registers, a removable disk, a carrier wave, a transmission line, any other suitable storage device, or any other apparatus or means through which the instructions may be transmitted.

The techniques described herein may be used for various wireless communication systems such as CDMA, TDMA, FDMA, OFDMA, and SC-FDMA. The terms "system" and "network" are often used interchangeably. A CDMA system may implement a radio technology such as Universal Terrestrial Radio Access (UTRA) or CDMA2000. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, or Flash-OFDM. UTRA and E-UTRA are part of Universal Mobile Telecommunication System (UMTS). 3GPP LTE is a release that uses E-UTRA, which employs OFDMA on the downlink, SC-FDMA on the uplink, and multiple-input multiple-output (MIMO) antenna technology to support more users and higher data rates. UTRA, E-UTRA, UMTS, LTE and GSM are described in documents from the 3GPP organization. CDMA2000 and UMB are described in documents from the 3rd Generation Partnership Project 2 (3GPP2) organization.

Referring now to FIG. 1, a wireless communication system 100 is illustrated. The system 100 includes a BS 102 that can include multiple antenna groups. For example, one antenna group can include antennas 104 and 106, another group can include antennas 108 and 110, and an additional group can include antennas 112 and 114. Two antennas are illustrated for each antenna group. However, more or fewer antennas can be utilized for each group. The BS 102 can additionally include a transmitter chain and a receiver chain, each of which can in turn include a plurality of components associated with signal transmission and reception (e.g., processors, modulators, multiplexers, demodulators, demultiplexers, antennas), as will be appreciated by one skilled in the art.

The BS 102 can communicate with one or more UEs such as the UE 116 and the UE 126. However, it is to be appreciated that the BS 102 can communicate with substantially any number of UEs similar to the UEs 116 and 126. The UEs 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, the UE 116 is in communication with the antennas 112 and 114. The antennas 112 and 114 transmit information to the UE 116 over a forward link 118 and receive information from the UE 116 over a reverse link 120. In a frequency division duplex (FDD) system, the forward link 118 can utilize a different frequency band than that used by the reverse link 120, for example. Further, in a time division duplex (TDD) system, the forward link 118 and the reverse link 120 can utilize a common frequency.

Each group of antennas and/or the area in which they are designated to communicate can be referred to as a sector of the BS 102. For example, antenna groups can be designed to communicate to UEs in a sector of the areas covered by the BS 102. In communication over the forward link 118, the transmitting antennas of the BS 102 can utilize beamforming to improve the signal-to-noise ratio (SNR) of the forward link 118 for the UE 116. While the BS 102 utilizes beamforming to transmit to the UE 116 scattered randomly through an associated coverage, UEs in neighboring cells can be subject to less interference as compared to a BS transmitting through a single antenna to all the UEs with which the BS is communicating. The UEs 116 and 126 can also communicate directly with one another using a peer-to-peer or ad hoc technology.

As shown in FIG. 1, the BS 102 can communicate with a network 122, such as a service provider's network, over a backhaul link connection. A femtocell 124 can be provided to facilitate communication with the UE 126 over the forward link 128 and the reverse link 130 (similarly to the forward link 118 and the reverse link 120, as described supra). The femtocell 124 can provide access to one or more UEs 126 much like the BS 102, but on a smaller scale. The femtocell 124 can be configured in a residence, business, and/or other close range setting. The femtocell 124 can connect to the network 122 utilizing a backhaul link connection, which can be over a broadband Internet connection (e.g., T1/T3, digital subscriber line (DSL), cable).

Figure 2:
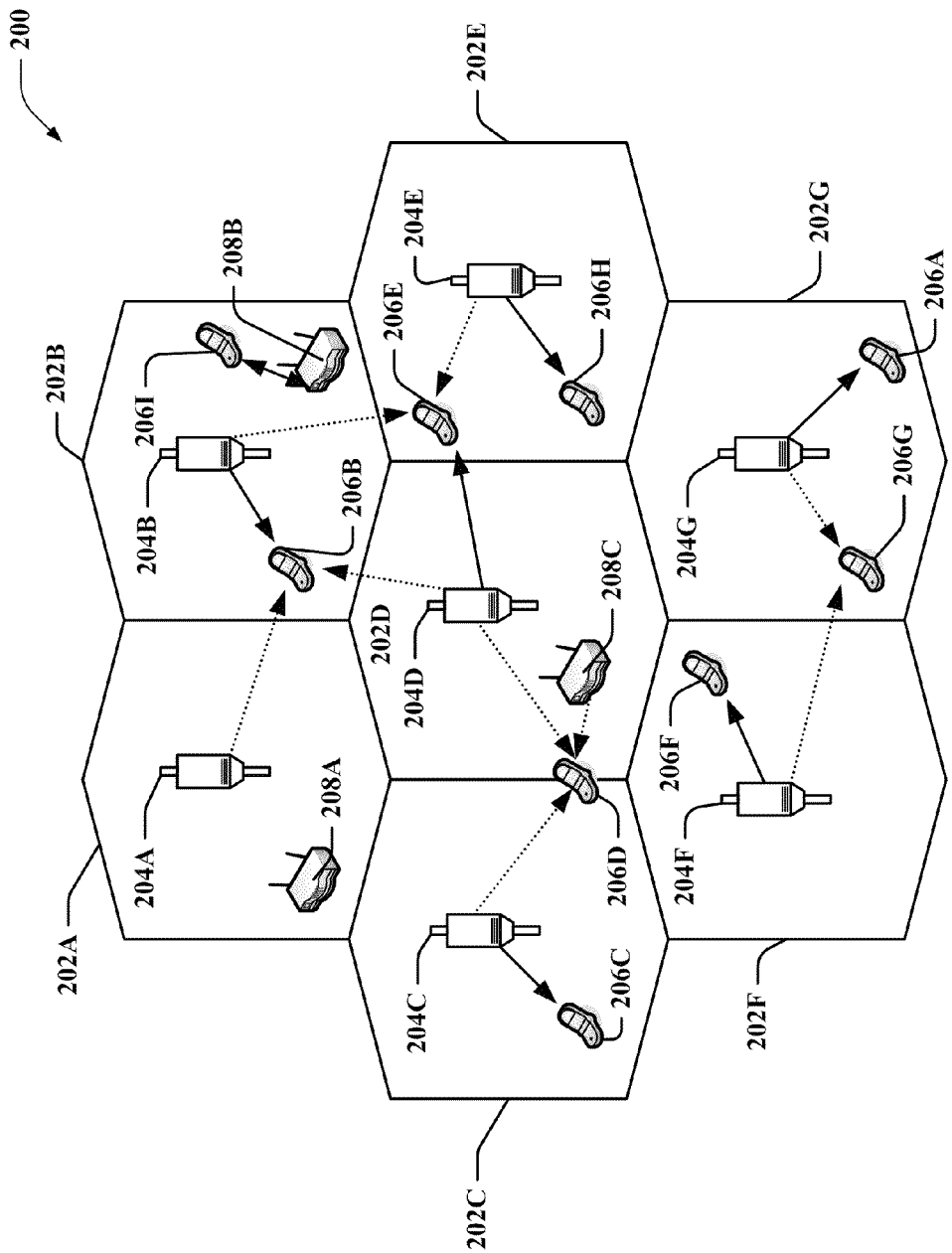
FIG. 2 is an illustration of a wireless communication network.

FIG. 2 is an illustration of a wireless communication network 200 configured to support a number of UEs. The system 200 provides communication for multiple cells, such as for example, macrocells 202A-202G, with each cell being serviced by corresponding BSs 204A-204G. The UEs 206A-206I are shown dispersed at various locations throughout the wireless communication system 200. Each UE 206A-206I can communicate with one or more BSs 204A-204G on a forward link and/or a reverse link, as described. In addition, the femtocells 208A-208C are shown. The UEs 206A-206I can additionally communicate with the femtocells 208A-208C. The wireless communication system 200 can provide service over a large geographic region, with the macrocells 202A-202G covering a broad area and the femtocells 208A-208C providing service in areas such as residences and office buildings. The UEs 206A-206I can establish connection with the BSs 204A-204G and/or the femtocells 208A-208C over the air and/or over a backhaul connection.

Figure 3:
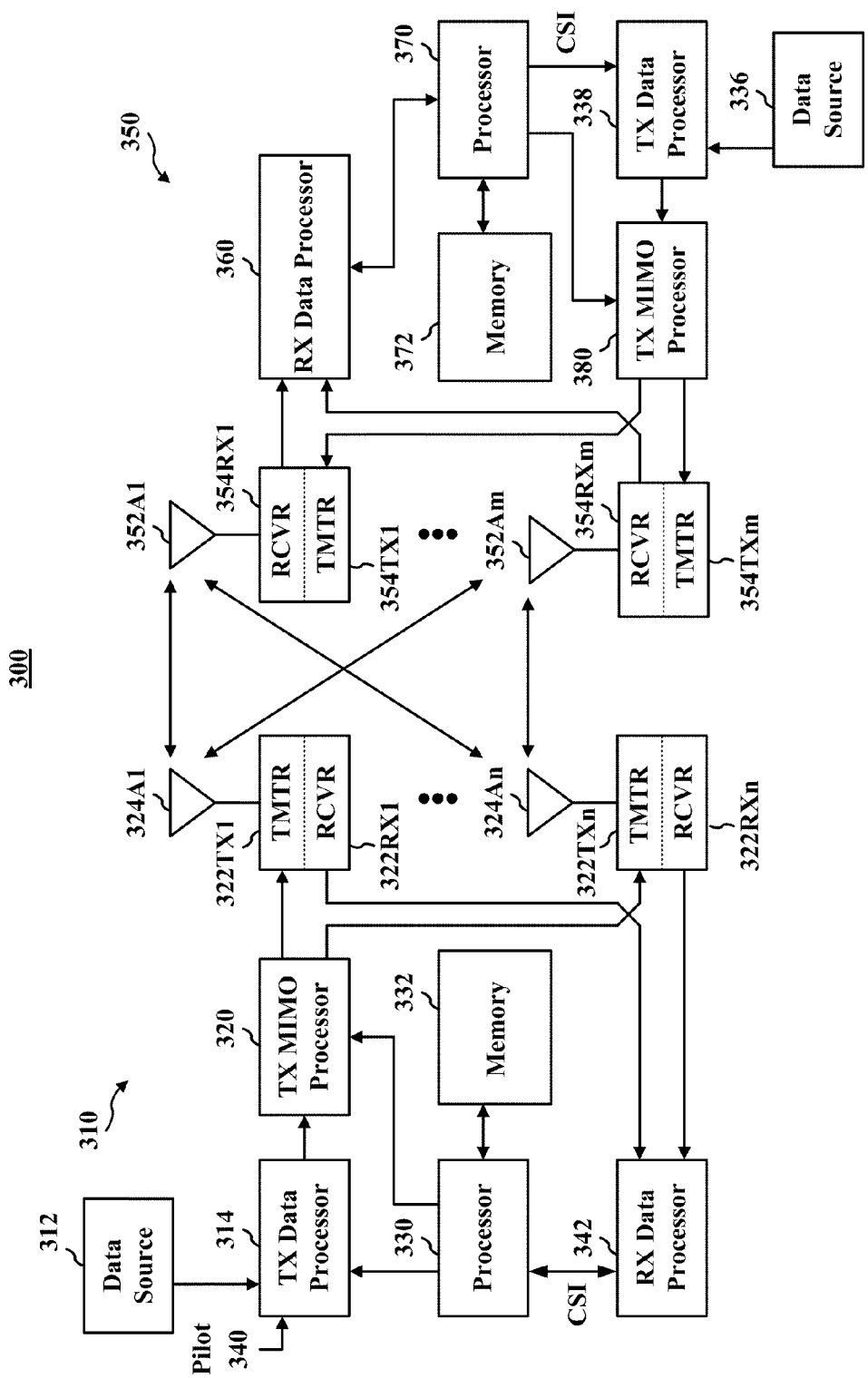
FIG. 3 is a block diagram of a wireless communication system.

FIG. 3 is a block diagram of a wireless communication system 300. The wireless communication system 300 depicts block diagrams for a BS 310 in communication with a UE 350. At BS 310, traffic data for a number of data streams is provided from a data source 312 to a transmit (TX) data processor 314. The TX data processor 314 formats, codes, and interleaves the traffic data stream based on a particular coding scheme selected for that data stream to provide coded data.

The TX data processor 314 may multiplex the coded data for each data stream with pilot data 340 using orthogonal frequency division multiplexing (OFDM) techniques. Additionally or alternatively, the pilot symbols can be frequency division multiplexed (FDM), time division multiplexed (TDM), or code division multiplexed (CDM). The pilot data 340 is typically a known data pattern that is processed in a known manner and can be used at the UE 350 to estimate the channel response. The TX data processor 314 can modulate the multiplexed pilot and coded data for each data stream based on a particular modulation scheme (e.g., binary phase-shift keying (BPSK), quadrature phase-shift keying (QPSK), M-phase-shift keying (M-PSK), M-quadrature amplitude modulation (M-QAM)) selected for that data stream to provide modulation symbols. The data rate, coding, and modulation for each data stream can be determined by instructions performed or provided by the processor 330.

In a BS 310 supporting MIMO communications, the modulation symbols for the data streams can be provided to a TX MIMO processor 320, which provides spatial processing for the modulation symbols (e.g., for OFDM). The TX MIMO processor 320 then provides n modulation symbol streams (or spatial streams) to n transmitters (TMTR) 322TX1 through 322TXn.

Each transmitter 322TX receives and processes a respective symbol stream to provide one or more analog signals, and further conditions (e.g., amplifies, filters, and upconverts) the analog signals to provide a modulated signal suitable for transmission over the MIMO channel. Further, n modulated signals from the transmitters 322TX are transmitted from n antennas 324A1 through 324An, respectively.

At the UE 350, the transmitted modulated signals are received by the m antennas 352A1 through 352Am and the received signal from each antenna 352 is provided to a respective receiver (RCVR) 354RX1 through 354RXm. Each receiver 354RX conditions (e.g., filters, amplifies, and downconverts) a respective signal, digitizes the conditioned signal to provide samples, and further processes the samples to provide a corresponding "received" symbol stream.

An RX data processor 360 can receive and process the m received symbol streams from m receivers 354 based on a particular receiver processing technique to provide n "detected" symbol streams. RX data processor 360 can demodulate, deinterleave, and decode each detected symbol stream to recover the traffic data for the data stream. The processing by RX data processor 360 is complementary to that performed by TX MIMO processor 320 and TX data processor 314 at the BS 310.

The processor 370 can formulate a reverse link message. The reverse link message can include various types of information regarding the communication link and/or the received data stream. The reverse link message is processed and modulated by a TX data processor 338, which also receives traffic data for a number of data streams from a data source 336, and further processed by the TX MIMO processor 380, conditioned by transmitters 354TX, and transmitted back to the BS 310.

The channel response estimate generated by the RX data processor 360 can be used to perform space, space/time processing at the receiver, adjust power levels, change modulation rates or schemes, or other actions. The RX data processor 360 can further estimate the signal-to-noise-and-interference ratios (SNRs) of the detected symbol streams, and possibly other channel characteristics, and provides these quantities to the processor 370. The RX data processor 360 or the processor 370 can further derive an estimate of the "operating" SNR for the system. The processor 370 then provides channel state information (CSI), which can comprise various types of information regarding the communication link and/or the received data stream. For example, the CSI can comprise only the operating SNR. In other embodiments, the CSI can comprise a channel quality indicator (CQI), which can be a numerical value indicative of one or more channel conditions. The CSI is then processed by the TX data processor 338, spatially processed by the TX MIMO processor 380, conditioned by transmitters 354TX1 through 354TXm, and transmitted back to the BS 310.

At the BS 310, the modulated signals from the UE 350 are received by the antennas 324, conditioned by the receivers 322RX, and demodulated and processed by a RX data processor 342 to extract the reverse link message transmitted by the UE 350.

The processors 330 and 370 can direct (e.g., control, coordinate, manage) operation at the BS 310 and the UE 350, respectively. The respective processors 330 and 370 can be associated with a memory 332 and 372 that store program codes and data. The processors 330 and 370 can also perform computations to derive frequency and impulse response estimates for the uplink and downlink, respectively.

Figure 4:
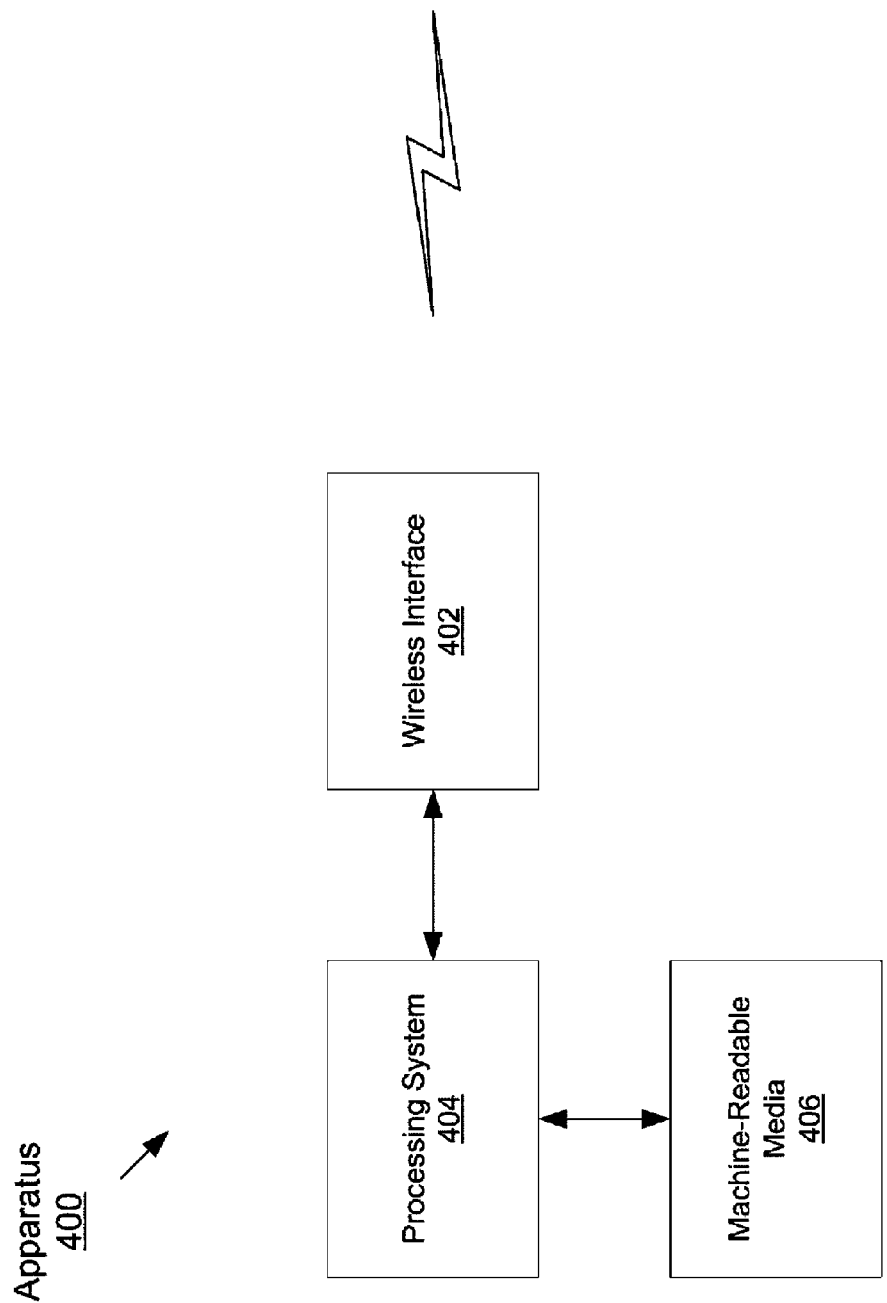
FIG. 4 is a block diagram illustrating a configuration for an apparatus.

FIG. 4 is a block diagram illustrating a configuration for an apparatus 400, which can be a UE 116 or a BS 102. The apparatus 400 may include a wireless interface 402, a processing system 404, and machine-readable media 406. When the apparatus 400 is a BS, the processing system 404 corresponds to the processor 330; the machine-readable media 406 corresponds to the memory 332; and the wireless interface 402 corresponds to the antennas 324A, the transceivers 322, the TX data processor 314, the TX MIMO processor 320, and the RX data processor 342. When the apparatus 400 is a UE, the processing system 404 corresponds to the processor 370; the machine-readable media 406 corresponds to the memory 372; and the wireless interface 402 corresponds to the antennas 352A, the transceivers 354, the TX data processor 338, the TX MIMO processor 380, and the RX data processor 360.

The wireless interface 402 may be integrated into the processing system 404 or distributed across multiple entities in the apparatus. The processing system 404 may be implemented with one or more processors. The one or more processors may be implemented with any combination of general-purpose microprocessors, microcontrollers, digital signal processors (DSPs), digital signal processing devices (DSPDs), field programmable gate array (FPGAs), programmable logic devices (PLDs), controllers, integrated circuits (ICs), application specific ICs (ASICs), state machines, gated logic, discrete hardware components, or any other suitable entities that can perform calculations or other manipulations of information.

The processing system 404 is coupled to machine-readable media 406 for storing software. Alternatively, the processing system 404 may itself include the machine-readable media 406. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 404 to perform the various functions described below, as well as various protocol processing functions.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, and/or data can be passed, forwarded, or transmitted using any suitable means including memory sharing, message passing, token passing, and network transmission.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 5:
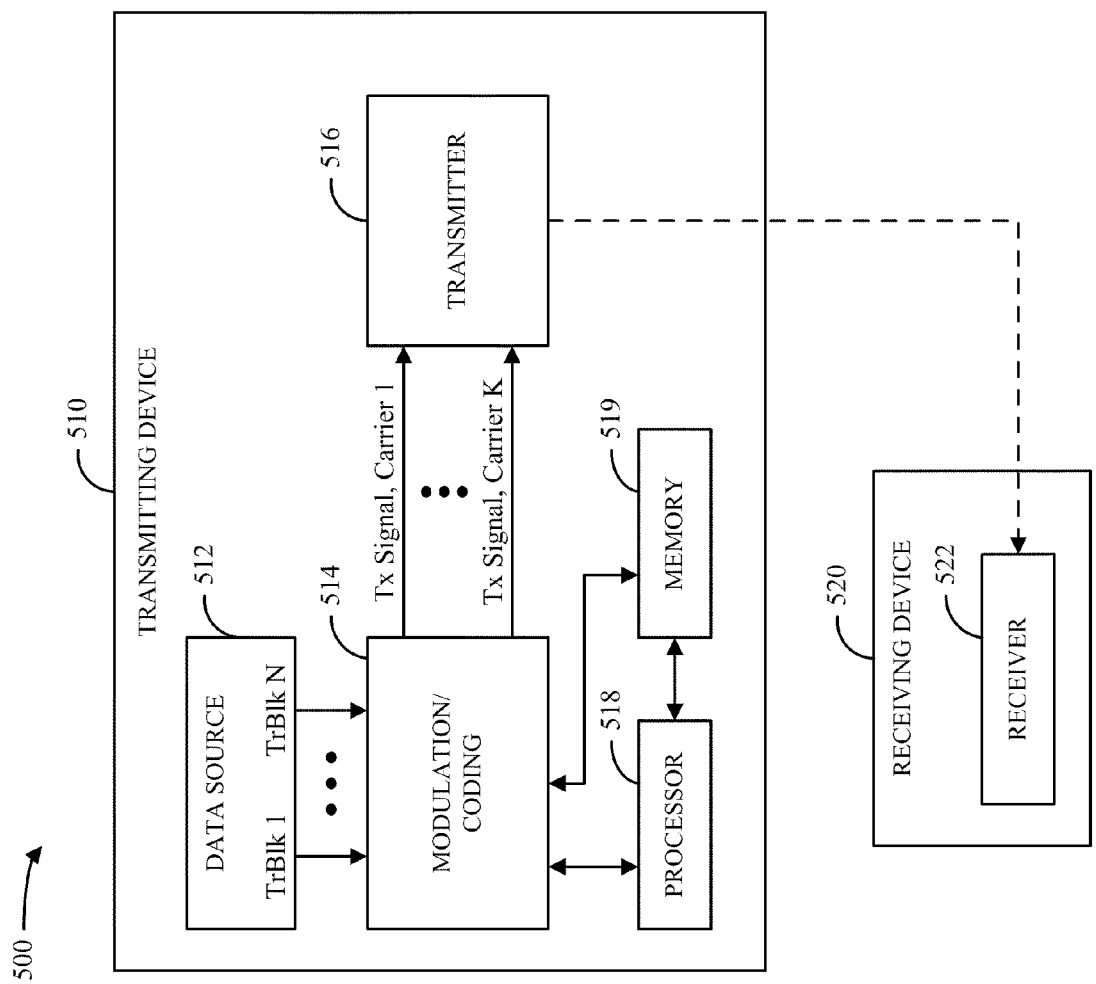
FIG. 5 is a block diagram of a system for processing and communicating information in a wireless communication system.

FIG. 5 is a block diagram of a system for processing and communicating information in a wireless communication system. The system 500 can include a transmitting device 510, which can transmit data, control signaling, and/or other information to a receiving device 520. In one example, the transmitting device 510 can include a data source 512, which can provide data for transmission to receiving device 520 in the form of, for example, one or more transport blocks. Each transport block includes a plurality of resource blocks. In an aspect, the data can be modulated and/or coded by a modulation/coding module 514 to generate a plurality of signals for transmission on a set of carriers (e.g., carriers in code, space, frequency, etc.). The modulation/coding module 514 can utilize one or more techniques for modulating and coding data to be transmitted over an allocation of multiple carriers. Upon generation, modulated and/or coded signals can be transmitted by a transmitter 516 to receiving device 520, where the signals can be received by a receiver 522 and/or otherwise processed. In one example, the transmitting device 510 can additionally utilize a processor 518 and/or a memory 519 to implement some or all of the functionality of the modulation/coding module 514 and/or any other suitable component(s) of transmitting device 510.

In one configuration, the transmitting device corresponds to the UE 116 and the receiving device 520 corresponds to the BS 102. In another configuration, the transmitting device corresponds to the BS 102 and the receiving device 520 corresponds to the UE 116. With reference to FIG. 3, if the BS 310 is the transmitting device, the data source 512 corresponds to the data source 312, the modulation/coding module 514 corresponds to the TX data processor 314, the transmitter 516 corresponds to the transmitters 322TX, the processor 518 corresponds to the processor 330, and the memory 519 corresponds to the memory 332. If the UE 350 is the transmitting device, the data source 512 corresponds to the data source 336, the modulation/coding module 514 corresponds to the TX data processor 338, the transmitter 516 corresponds to the transmitters 354TX, the processor 518 corresponds to the processor 370, and the memory 519 corresponds to the memory 372.

Figure 6:
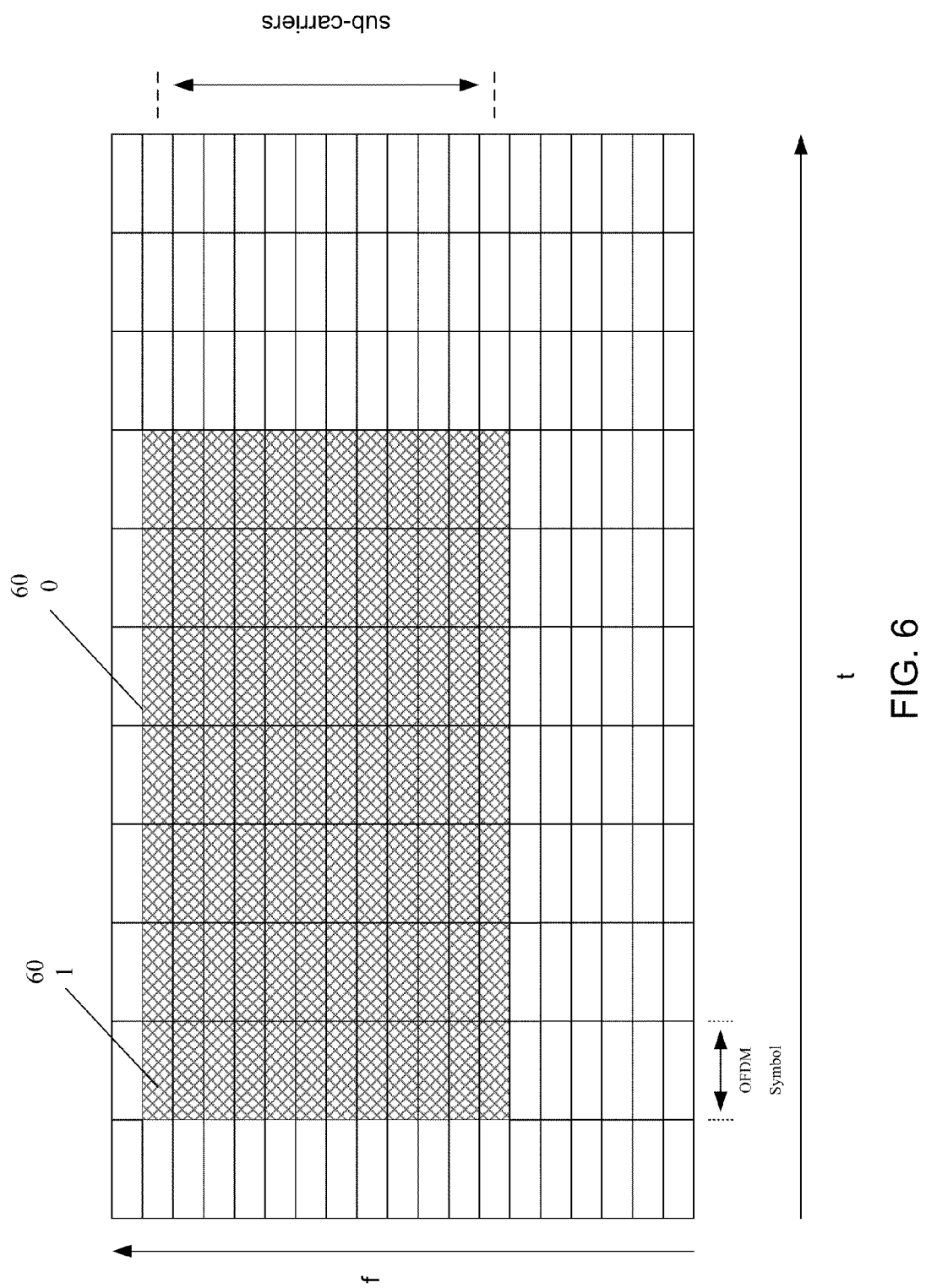
FIG. 6 is a conceptual time-frequency grid illustrating a resource block for transmission on a carrier.

FIG. 6 is a conceptual time-frequency grid illustrating a resource block 600 for transmission on a carrier. A resource block 600 includes 84 resource elements 601 and spans 12 sub-carriers/tones (180 kHz)×7 OFDM symbols (0.5 ms). The size of the resource elements, and thus the resource block, depends on the modulation and coding scheme selected for the resource block. Each UE is allocated a number of resource blocks in the time-frequency grid. The more resources a UE receives and the higher the modulation used in the resource elements, the higher the bit-rate for the UE.

Figure 7:
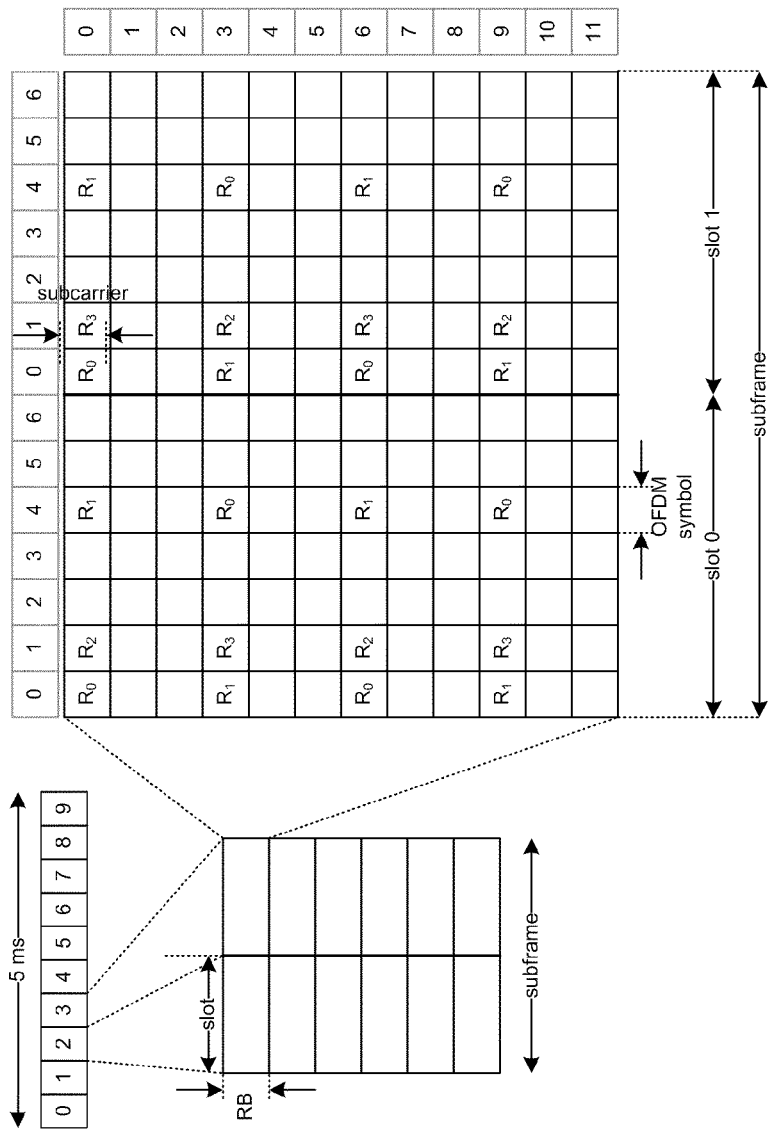
FIG. 7 is a conceptual diagram illustrating the resource block within a slot and a subframe.

FIG. 7 is a conceptual diagram illustrating the resource block within a slot and a subframe. Half of a frame consists of 5 subframes. Each subframe is 1 ms. Each subframe includes two slots and each slot includes 7 OFDM symbols×12 OFDM tones or sub-carriers, providing 84 resource elements. Some of the resource elements, as indicated as $R_0$ through $R_3$ in FIG. 7, include a resource signal. The resource signal may be referred to as a common resource signal (CRS), a beacon signal, and/or a pilot signal.

Figure 8:
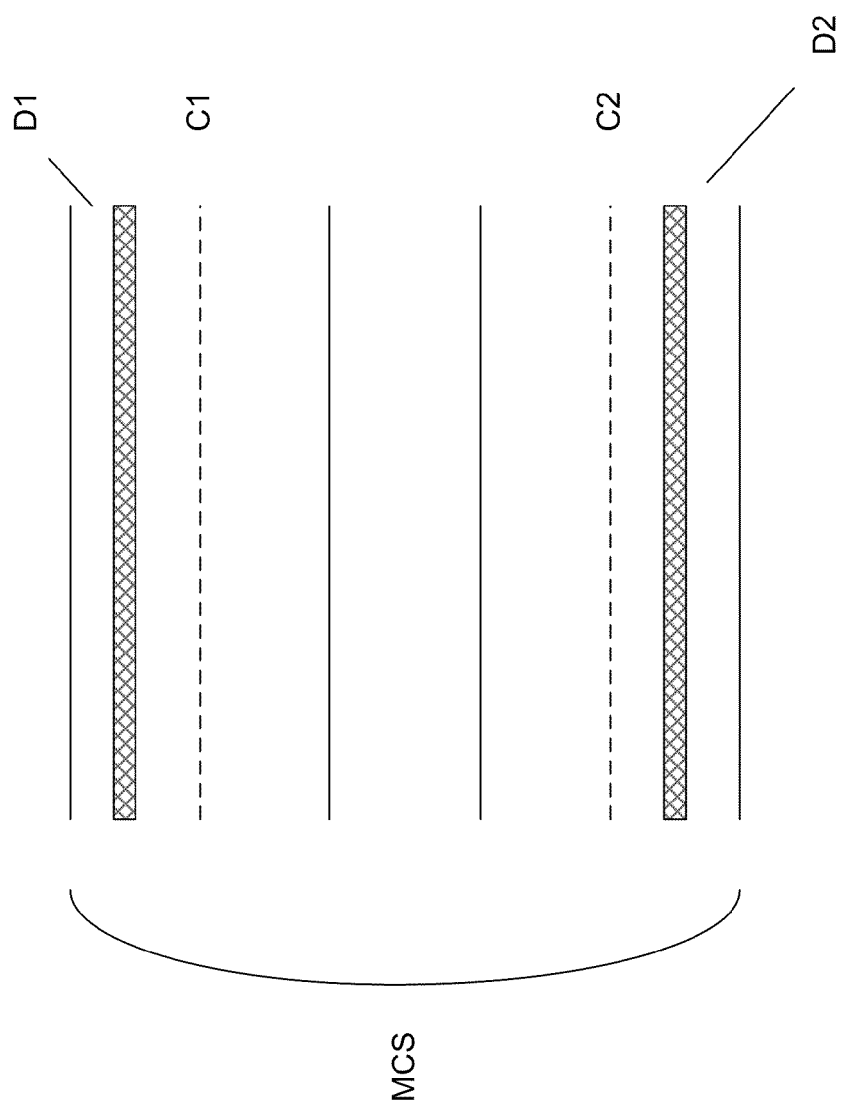
FIG. 8 is a conceptual diagram illustrating a common MCS across the carriers.

FIG. 8 is a conceptual diagram illustrating a common MCS across the carriers. The BS 102 and the UE 116 may communicate through a plurality of carriers C1, C2. The carriers C1, C2 may be UL carriers used to communicate in the reverse link 120 or DL carriers used to communicate in the forward link 118. The carrier C1 includes data D1 and the carrier C2 includes data D2 for transmission/reception. The data D1, D2 may be allocated one or more resource blocks in frequency, each spanning 180 kHz, for one subframe. As depicted in FIG. 8, the same modulation and coding scheme (MCS) is utilized for modulating the data D1 and D2 on the separate carriers C1, C2. The MCS is determined by a scheduler in a BS 102. The scheduler is within the processor 330 (FIG. 3), the processing system 404 (FIG. 4), and the processor 518 (FIG. 5).

Assuming C1 and C2 are DL carriers, the UE 116 determines a channel quality for each of the DL carriers C1, C2 and sends channel quality indication (CQI) feedback to the BS 102 for each of the DL carriers C1, C2. In one configuration, the UE 116 sends separate CQI feedback for each of the DL carriers C1, C2. In another configuration, the UE 116 averages the CQI feedback for the two DL carriers C1, C2, and sends the average CQI feedback to the BS 102. The BS 102 receives the CQI feedback, averages the CQI feedback if not already averaged, and determines a single MCS based on the averaged CQI feedback. The BS 102 notifies the UE 116 of the determined MCS in a DL grant sent on at least one of the DL carriers C1, C2. The BS 102 may also notify the UE 116 of the DL carriers to use and the resources allocated on the DL carriers. The BS 102 modulates and codes the data D1, D2 based on the determined MCS and transmits the modulated and coded data to the UE 116 through the DL carriers C1, C2. The UE 116 receives the modulated and coded data in the DL carriers C1 and C2 and demodulates and decodes the data based on the determined MCS.

Assuming C1 and C2 are UL carriers, the BS 102 receives a signal in each of the uplink carriers C1 and C2 and determines a channel quality of each of the signals. The BS 102 averages the channel quality and based on the averaged channel quality, the BS 102 determines an MCS. The BS 102 notifies the UE 116 of the determined MCS in a UL grant. The BS 102 may also notify the UE 116 of the UL carriers to use and the resources allocated on the UL carriers. The UE 116 uses the determined MCS to modulate and code data and transmits the data in the uplink carriers C1, C2 according to the UL grant. The BS 116 demodulates and decodes the data received in the uplink carriers C1 and C2 using the determined MCS.

Figure 9:
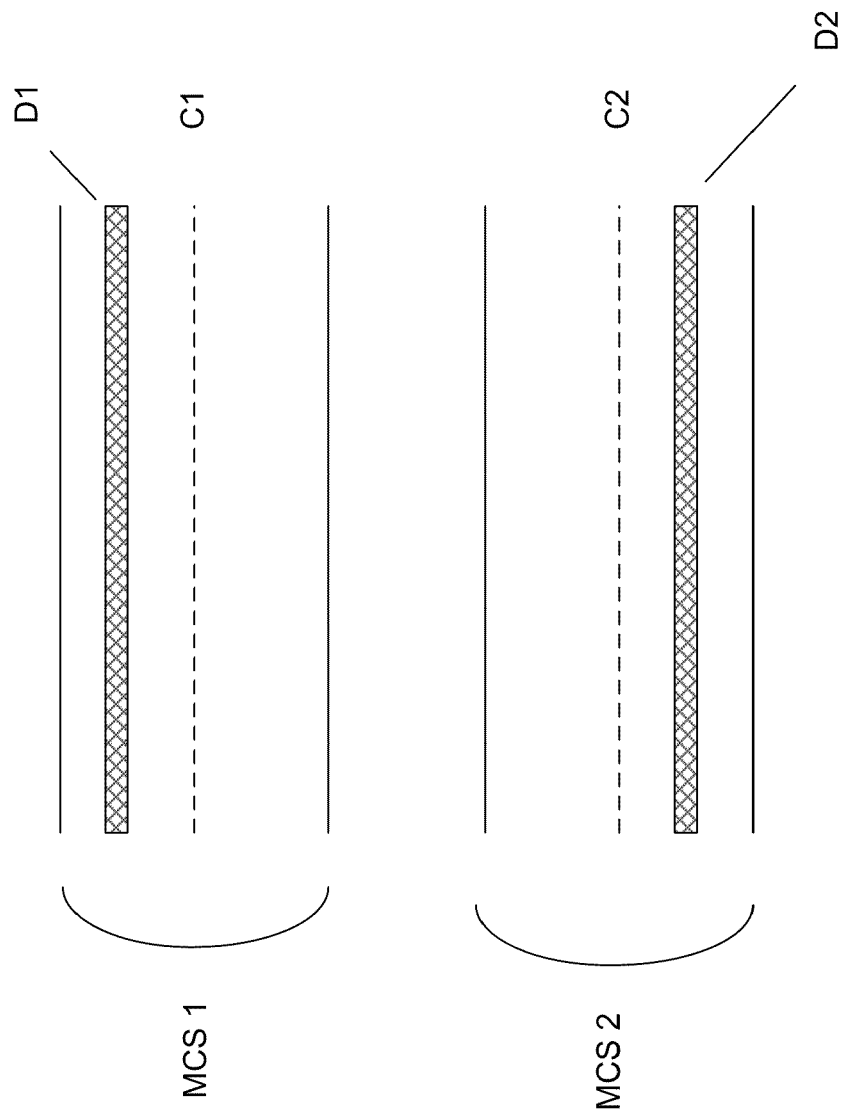
FIG. 9 is a conceptual diagram illustrating a dedicated MCS for each of the carriers.

FIG. 9 is a conceptual diagram illustrating a dedicated MCS for each of the carriers. As shown in FIG. 9, an MCS is selected for each carrier C1 and C2. MCS 1 is utilized for modulating and coding the data D1 and MCS 2 is utilized for modulating and coding the data D2. MCS 1 and MSC 2 may be same MCS or a different MCS, as the MCS for each carrier is a function of CQI feedback for that carrier.

Assuming C1 and C2 are DL carriers, the UE 116 determines a channel quality for each of the DL carriers C1, C2 and sends CQI feedback to the BS 102 for each of the DL carriers C1, C2. The BS 102 receives the CQI feedback and determines that MCS 1 be used for the DL carrier C1 and, separately, that MCS 2 be used for the DL carrier C2. The BS 102 notifies the UE 116 of the determined MCSs (i.e., MSC 1 and MSC 2) in a DL grant sent on at least one of the DL carriers C1, C2. The BS 102 modulates and codes the data D1, D2 based on the determined MCSs and transmits the modulated and coded data to the UE 116 through the DL carriers C1, C2. The UE 116 receives the modulated and coded data in the DL carriers C1 and C2 and demodulates and decodes the data based on the determined MCSs.

Assuming C1 and C2 are UL carriers, the BS 102 receives a signal in each of the uplink carriers C1 and C2 and determines a channel quality of each of the signals. The BS 102 determines that MCS 1 be used for the UL carrier C1 and that MCS 2 be used for the UL carrier C2. The BS 102 notifies the UE 116 of the determined MCSs (i.e., MCS 1 and MCS 2) in a UL grant. The UE 116 uses the determined MCSs to modulate and code data and transmits the data in the uplink carriers C1, C2 according to the UL grant. The BS 116 demodulates and decodes the data received in the uplink carriers C1 and C2 using the determined MCSs.

Figure 10:
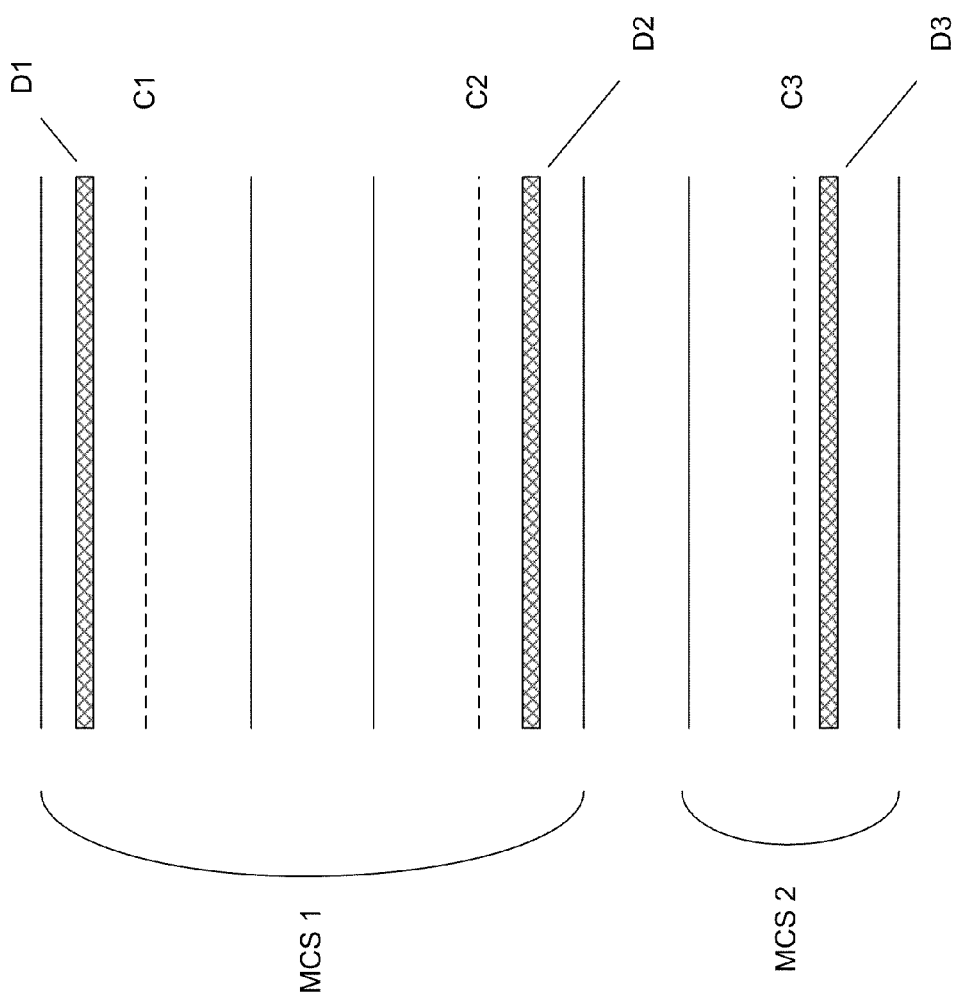
FIG. 10 is a conceptual diagram illustrating a common MCS across groups of carriers.

FIG. 10 is a conceptual diagram illustrating a common MCS across groups of carriers. As shown in FIG. 10, MCS 1 is utilized for modulating and coding the data D1 and D2 and MCS 2 is utilized for modulating and coding the data D3.

Assuming C1, C2, and C3 are DL carriers, the UE 116 determines a channel quality for each of the DL carriers C1, C2, C3 and sends CQI feedback to the BS 102 for each of the DL carriers C1, C2, C3. In one configuration, the UE 116 sends separate CQI feedback for each of the DL carriers C1, C2, C3. In another configuration, the UE 116 averages the CQI feedback for the two DL carriers C1, C2 and sends the average CQI feedback and the CQI feedback for the DL carrier C3 to the BS 102. The BS 102 receives the CQI feedback, averages the CQI feedback for DL carriers C1 and C2 if not already averaged, and determines that MCS 1 be used for the DL carriers C1, C2 based on the averaged CQI feedback and that MCS 2 be used for the DL carrier C3 based on the CQI feedback for DL carrier C3. The BS 102 notifies the UE 116 of the determined MCSs (i.e., MSC 1 and MSC 2) in a DL grant sent on at least one of the DL carriers C1, C2, C3. The BS 102 modulates and codes the data D1, D2, D3 based on the determined MCSs and transmits the modulated and coded data to the UE 116 through the DL carriers C1, C2, C3. The UE 116 receives the modulated and coded data in the DL carriers C1, C2, C3 and demodulates and decodes the data based on the determined MCSs.

Assuming C1, C2, and C3 are UL carriers, the BS 102 receives a signal in each of the uplink carriers C1, C2, C3 and determines a channel quality of each of the signals. The BS 102 averages the determined channel quality for the uplink carriers C1 and C2. The BS 102 determines that MCS 1 be used for the UL carriers C1 and C2 based on the averaged channel quality and that MCS 2 be used for the UL carrier C3 based on the determined channel quality for UL carrier C3. The BS 102 notifies the UE 116 of the determined MCSs (i.e., MCS 1 and MCS 2) in a UL grant. The UE 116 uses the determined MCSs to modulate and code data and transmits the data in the uplink carriers C1, C2, C3 according to the UL grant. The BS 116 demodulates and decodes the data received in the uplink carriers C1, C2, C3 using the determined MCSs.

Figure 11:
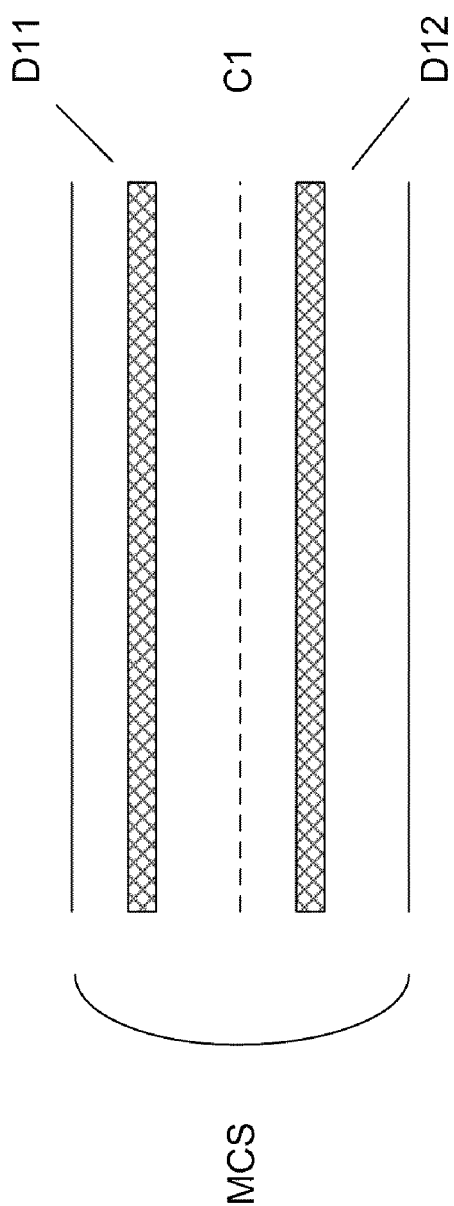
FIG. 11 is a conceptual diagram illustrating a common MCS across multiple bandwidth allocations.

FIG. 11 is a conceptual diagram illustrating a common MCS across multiple bandwidth allocations. The BS 102 receives a signal in the uplink carrier C1 and determines a channel quality of the signal. The BS 102 determines that a particular MCS be used for the UL carrier C1 based on the determined channel quality. The BS 102 notifies the UE 116 of the determined MCS in a UL grant. The BS 102 may also notify the UE 116 of the carriers and the allocated resources to use on those carriers. The UE 116 uses the determined MCS to modulate and code data and transmits the data in the allocated resources D11, D12 according to the UL grant. The BS 116 demodulates and decodes the data received in the uplink carrier C1 using the determined MCS. In one configuration, the UL carrier C1 contains N×SC-FDMA transmissions, with $N \geq 2$. As shown in FIG. 11, in such a configuration, the allocated resources D11, D12 would correspond to N=2.

Figure 12:
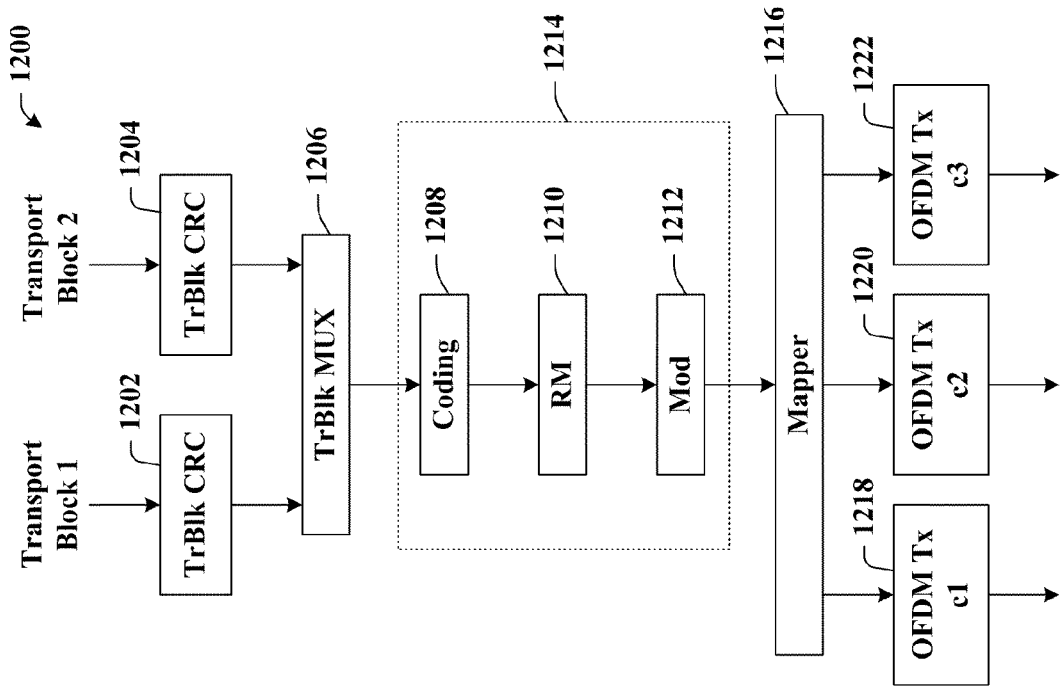
FIG. 12 is a block diagram for the common MCS.

FIG. 12 is a block diagram for the common MCS 1200. The common MCS 1200 occurs within the modulation/coding module 514 of FIG. 5 or the TX data processor 314 of FIG. 3 and may additionally occur within the processor 518 of FIG. 5 or the processor 330 of FIG. 3. A transport block is data accepted by the physical layer to be jointly encoded. As described supra, a transport block contains a plurality of resource blocks. All of the resource blocks within one transport block are jointly encoded. As shown in FIG. 12, in the common MCS, a plurality of transport blocks are jointly multiplexed and coded with the same MCS. Each of the transport blocks 1, 2 are passed to a transport block cyclic redundancy check (CRC) 1202, 1204, respectively, and are then multiplexed together in the transport block multiplexer 1206. The combined data are coded (1208), rate matched (1210), and modulated (1212) with a common MCS (1214), and are then passed to the mapper module 1216. The mapper module 1216 maps the data for OFDM transmission. If there are three carriers as shown in FIG. 8, the data are mapped for OFDM transmission on the carriers C1 (1218), C2 (1220), C3 (1222).

The UE 116 and/or the BS 102 that perform the common MCS 1200 may divide up the transport blocks to maintain compatibility with legacy systems. As such, the UE 116 or the BS 102 that applies the common MCS, may determine a number N of transport blocks to which to apply the common MCS and a size of each of the N transport blocks. In one configuration, the number N of transport blocks is determined by $N=\lceil T/T' \rceil$, where T is a transport block size determined based on a number of resource blocks $N_{RB}$ in a transport block and an index of the MCS, and T' is a legacy transport block size determined based on a number of resource blocks $N'_{RB}$ in a legacy transport block and the index of the MCS. In such a configuration, the size of each of the N transport blocks is T' for the first N−1 transport blocks and T−(N−1)T' rounded up to a nearest legacy transport block size for the $N^{th}$ transport block. In a second configuration, the transport blocks are evenly split and a size of each of the N transport blocks is T/N rounded up to a nearest legacy transport block size. In one example, the legacy transport block size conforms to an LTE release to which compatibility should be maintained.

The desirable legacy transport block length T' may be predefined or signaled to the UE. No additional information on transport block sizes/boundaries would be needed in the DL grant. A bit could be defined to inform if there is a hybrid automatic repeat request (HARQ) feedback per transport block or a single HARQ feedback for all transport blocks (ACK bundling). Such a configuration may be desirable in case of UL mapping limitations. Whether there is HARQ feedback per transport block or a single HARQ feedback for all transport blocks could be conveyed to a UE dynamically in the grant or semi-statically by RRC signaling.

Figure 13:
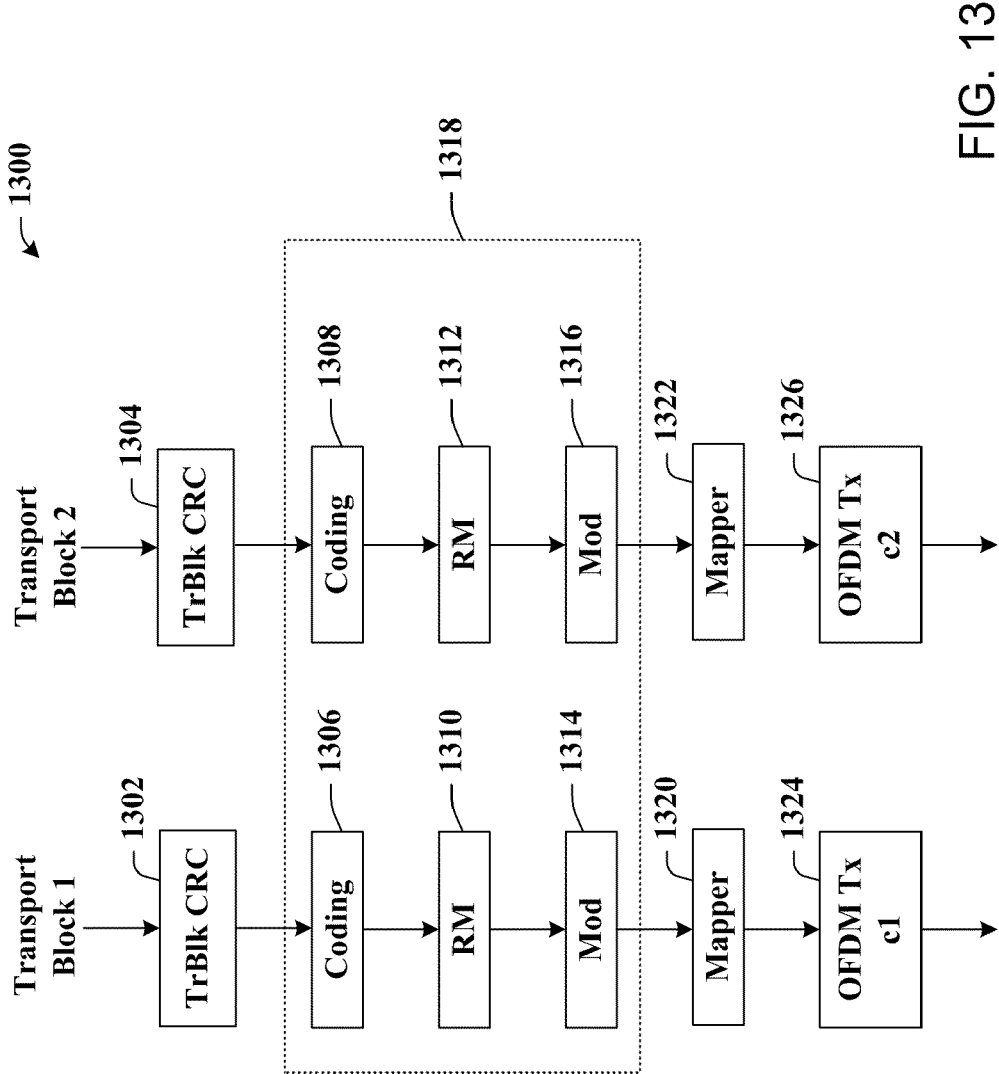
FIG. 13 is a block diagram for the dedicated MCS.

FIG. 13 is a block diagram for the dedicated MCS 1300. The dedicated MCS 1300 occurs within the modulation/coding module 514 of FIG. 5 or the TX data processor 314 of FIG. 3 and may additionally occur within the processor 518 of FIG. 5 or the processor 330 of FIG. 3. As shown in FIG. 13, in the dedicated MCS, a plurality of transport blocks are each independently multiplexed and encoded with a dedicated MCS. The transport block 1 is passed through a transport block CRC 1302, a coding module 1306, a rate matching module 1310, and a modulation module 1314. Subsequently, the data are passed to the mapper module 1320, which assuming there are two carriers as shown in FIG. 9, maps the data for OFDM transmission on the carrier C1 (1324). The transport block 2 is passed through a transport block CRC 1304, a coding module 1308, a rate matching module 1312, and a modulation module 1316. Subsequently, the data are passed to the mapper module 1322, which maps the data for OFDM transmission on carrier C2 (1326).

The MCS for the two transport blocks (1318) are each determined separately based on CQI feedback received corresponding to the carriers (i.e., C1, C2) on which the transport blocks are transmitted. One transport block may span a carrier, with one acknowledgement (ACK) per DL carrier. In one configuration, one transport block is not allowed to span multiple carriers due to the different MCS across carriers and an ACK mapping issue.

Figure 14:
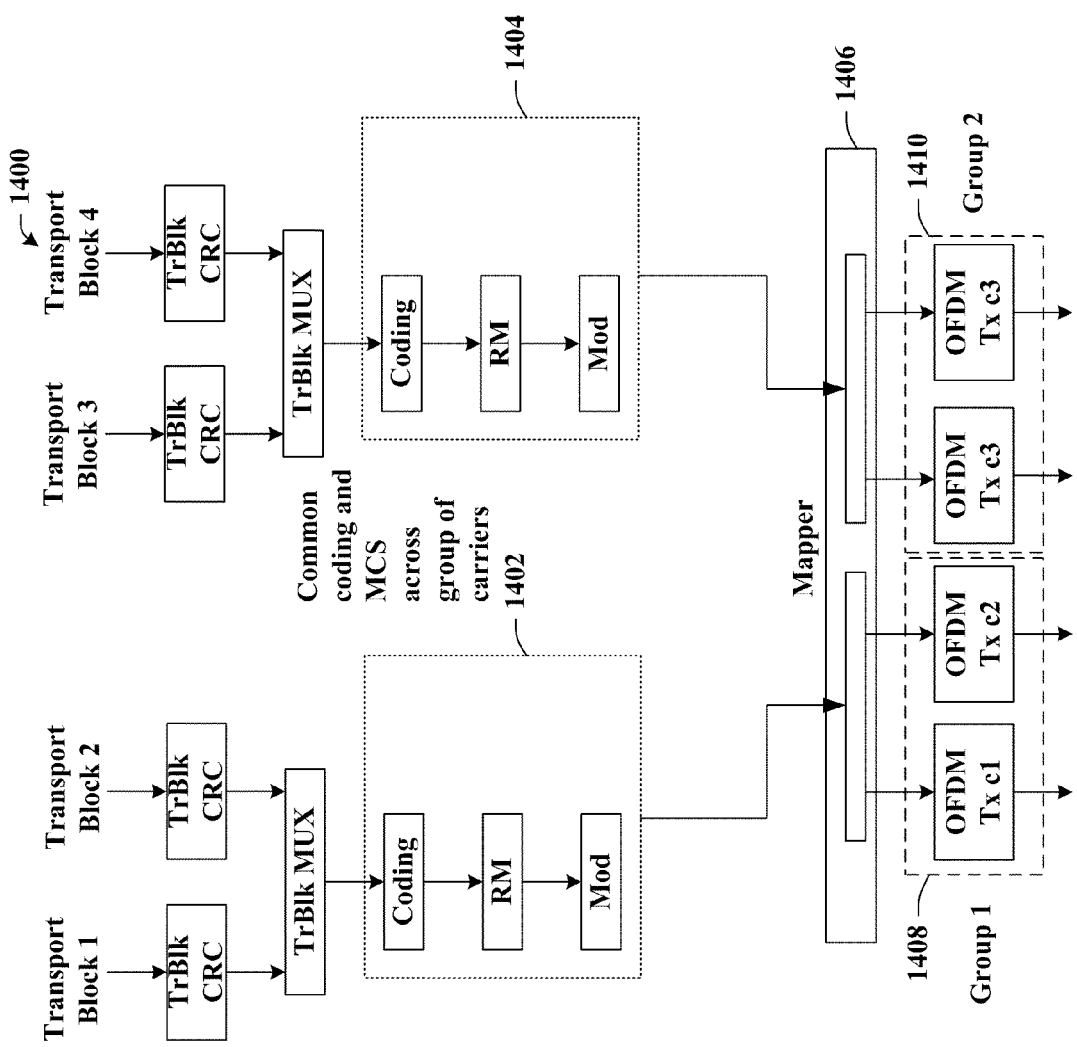
FIG. 14 is a block diagram for the common MCS across groups of carriers.

FIG. 14 is a block diagram for the common MCS across groups of carriers 1400. The common MCS across groups of carriers 1400 occurs within the modulation/coding module 514 of FIG. 5 or the TX data processor 314 of FIG. 3 and may additionally occur within the processor 518 of FIG. 5 or the processor 330 of FIG. 3. The transport blocks 1, 2 are each passed through a transport block CRC and are multiplexed together. The combined data are then coded, rate matched, and modulated using a common MCS (1402). Similarly, the transport blocks 3, 4 are each passed through a transport block CRC and are multiplexed together. The combined data are then coded, rate matched, and modulated using a common MCS (1404). The data are then passed to a mapper module 1406. Assuming the arrangement of carriers and MCS as shown in FIG. 10, the data including transport blocks 1, 2 are mapped in group 1 (1408) for OFDM transmission on carriers C1, C2; and the data including transport blocks 3, 4 are mapped in group 2 (1410) for OFDM transmission on carriers C3, C4.

Figure 15:
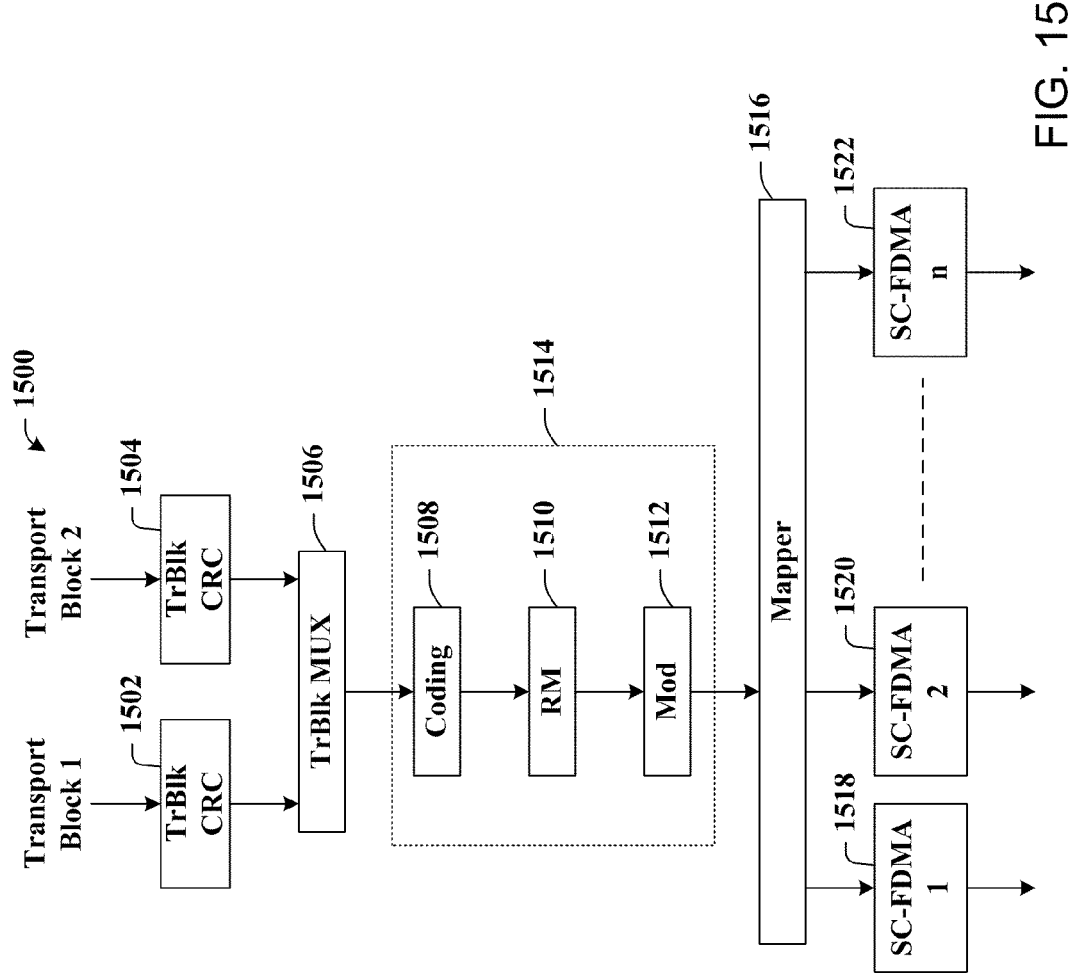
FIG. 15 is a block diagram for the common MCS across multiple bandwidth allocations.

FIG. 15 is a block diagram for the common MCS across multiple bandwidth allocations 1500. The common MCS across multiple bandwidth allocations 1500 occurs within the modulation/coding module 514 of FIG. 5 or the TX data processor 314 of FIG. 3 and may additionally occur within the processor 518 of FIG. 5 or the processor 330 of FIG. 3. Each of the transport blocks 1, 2 are passed to transport block CRCs 1502, 1504, respectively, and are then multiplexed together in the transport block multiplexer 1506. The combined data are coded (1508), rate matched (1510), and modulated (1512) with a common MCS (1514), and are then passed to the mapper module 1516. The mapper module 1516 maps the data for OFDM transmission. Assuming the arrangement of carriers and allocated resources as shown in FIG. 11, the data are mapped for N×SC-FDMA transmissions (1518, 1520, 1522).

Figure 16:
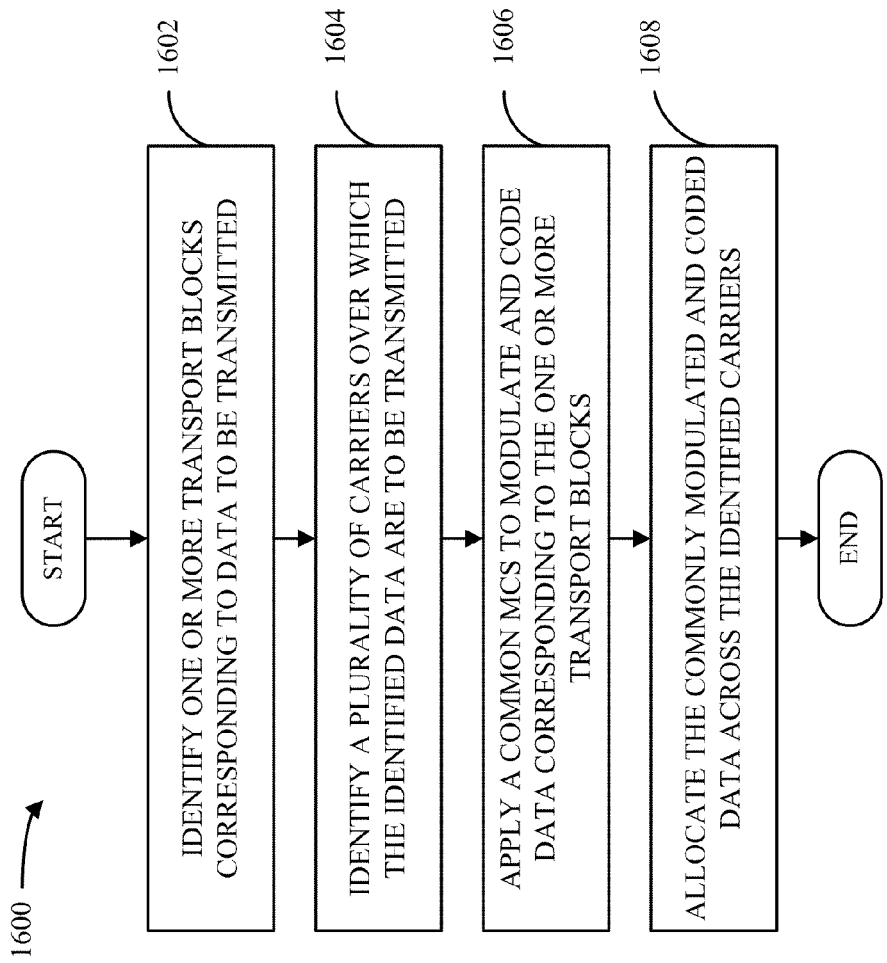
FIG. 16 illustrates a methodology for applying common MCS for data across a multicarrier allocation.

FIG. 16 illustrates a methodology 1600 for applying common MCS for data across a multi-carrier allocation. At block 1602, one or more transport blocks corresponding to data to be transmitted are identified. At block 1604, a plurality of carriers over which the identified data are to be transmitted are identified. At block 1606, a common MCS is applied to modulate and code data corresponding to the one or more transport blocks. At block 1608, the commonly modulated and coded data are allocated across the identified carriers.

Figure 17:
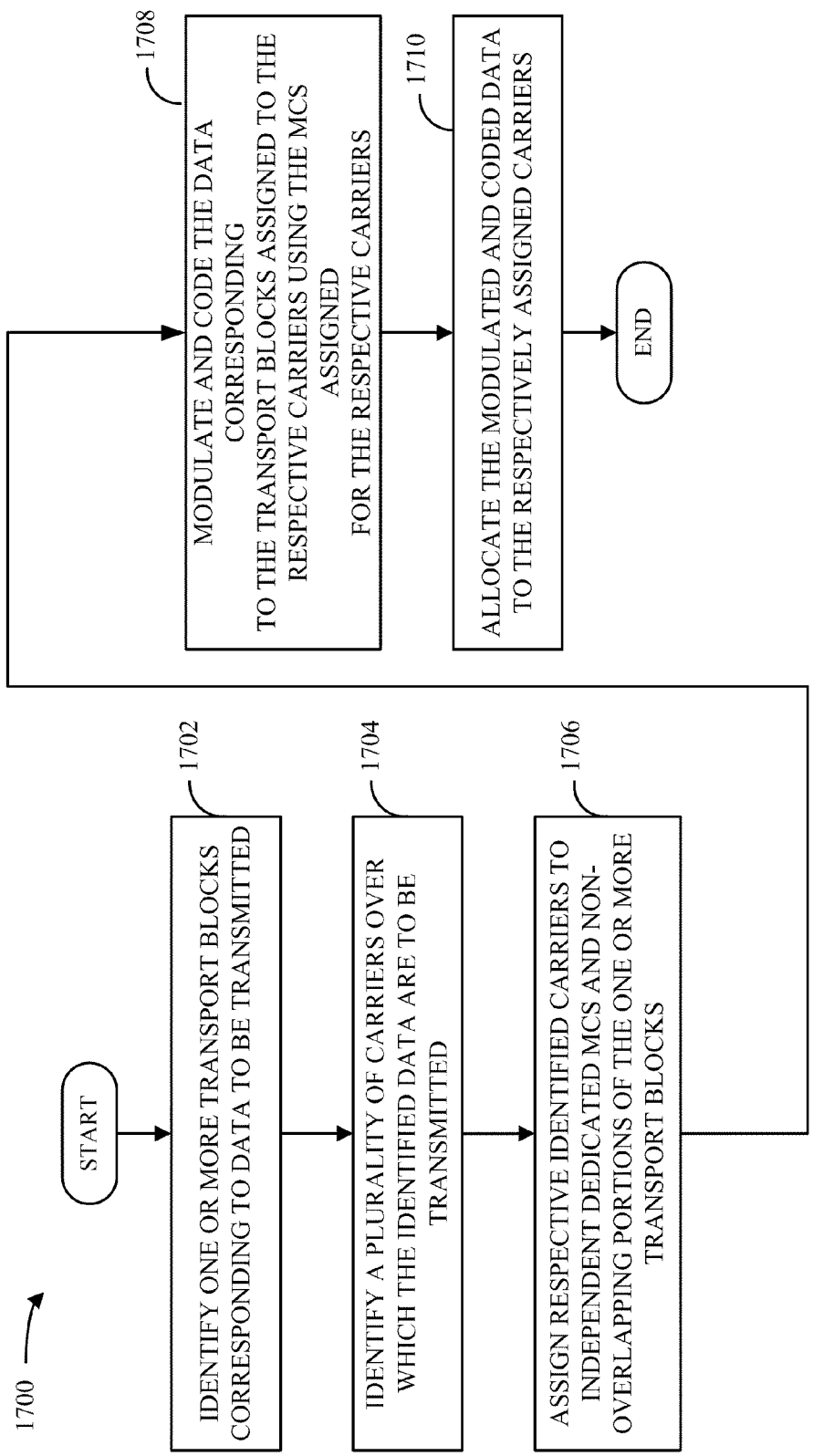
FIG. 17 illustrates a methodology for applying dedicated MCS for data per carrier allocation.

FIG. 17 illustrates a methodology 1700 for applying dedicated MCS for data per carrier allocation. At block 1702, one or more transport blocks corresponding to data to be transmitted are identified. At block 1704, a plurality of carriers over which the identified data are to be transmitted are identified. At block 1706, respective identified carriers are assigned to independent MCS (i.e., separately determined MCS) and non-overlapping portions of the one or more transport blocks. At block 1708, the data corresponding to the transport blocks assigned to the respective carriers are modulated and coded using the MCS assigned for the respective carriers. At block 1710, the modulated and coded data are allocated to the respectively assigned carriers.

Figure 18:
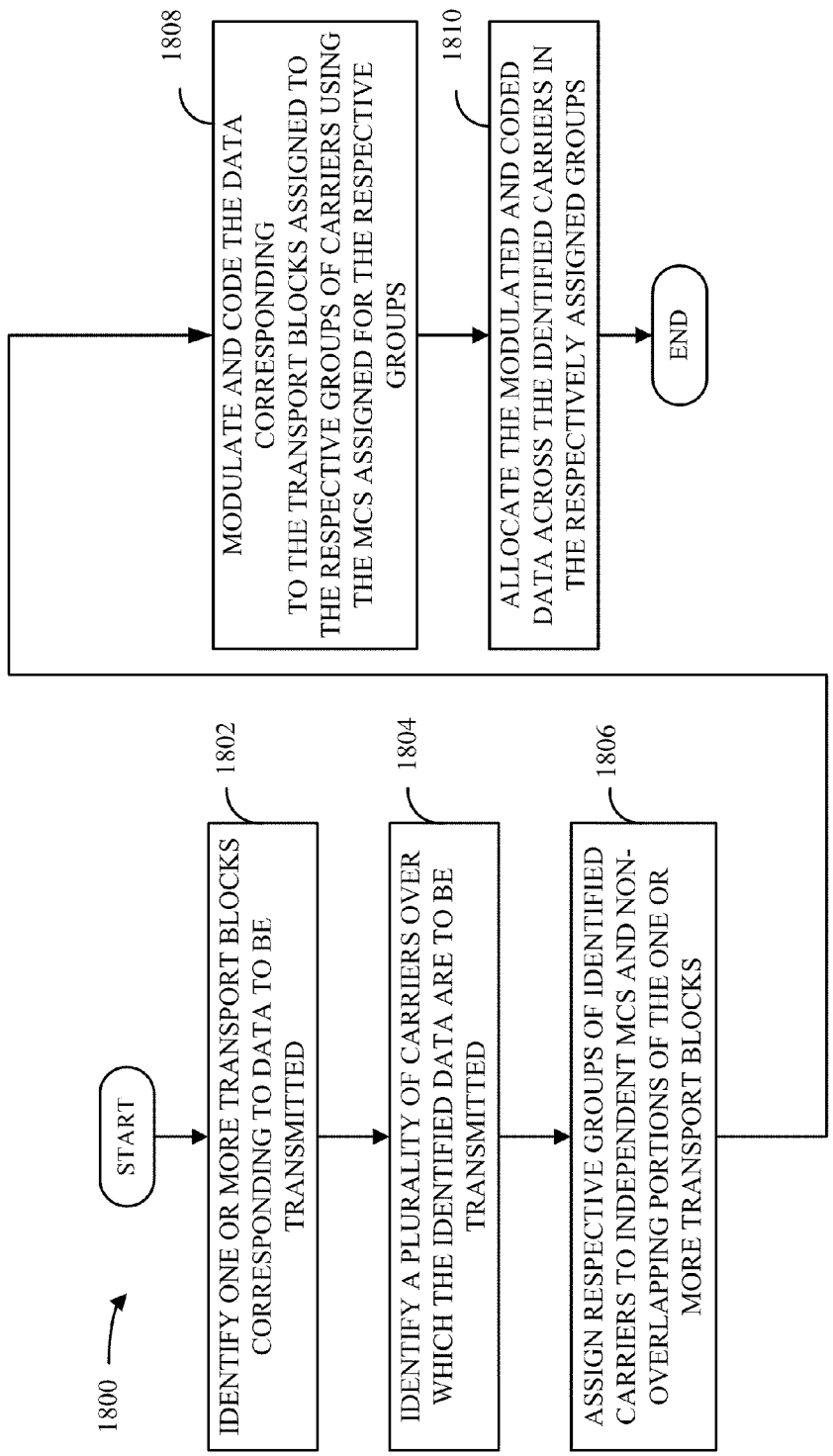
FIG. 18 illustrates a methodology for applying common MCS for data across respective groups of allocated carriers.

FIG. 18 illustrates a methodology 1800 for applying common MCS for data across respective groups of allocated carriers. At block 1802, one or more transport blocks corresponding to data to be transmitted are identified. At block 1804, a plurality of carriers over which the identified data are to be transmitted are identified. At block 1806, respective groups of identified carriers are assigned to independent MCS (i.e., separately determined MCS) and non-overlapping portions of the one or more transport blocks. At block 1808, the data corresponding to the transport blocks assigned to the respective groups of carriers are modulated and coded using the MCS assigned for the respective groups. At block 1810, the modulated and coded data are allocated across the identified carriers in the respectively assigned groups.

Figure 19:
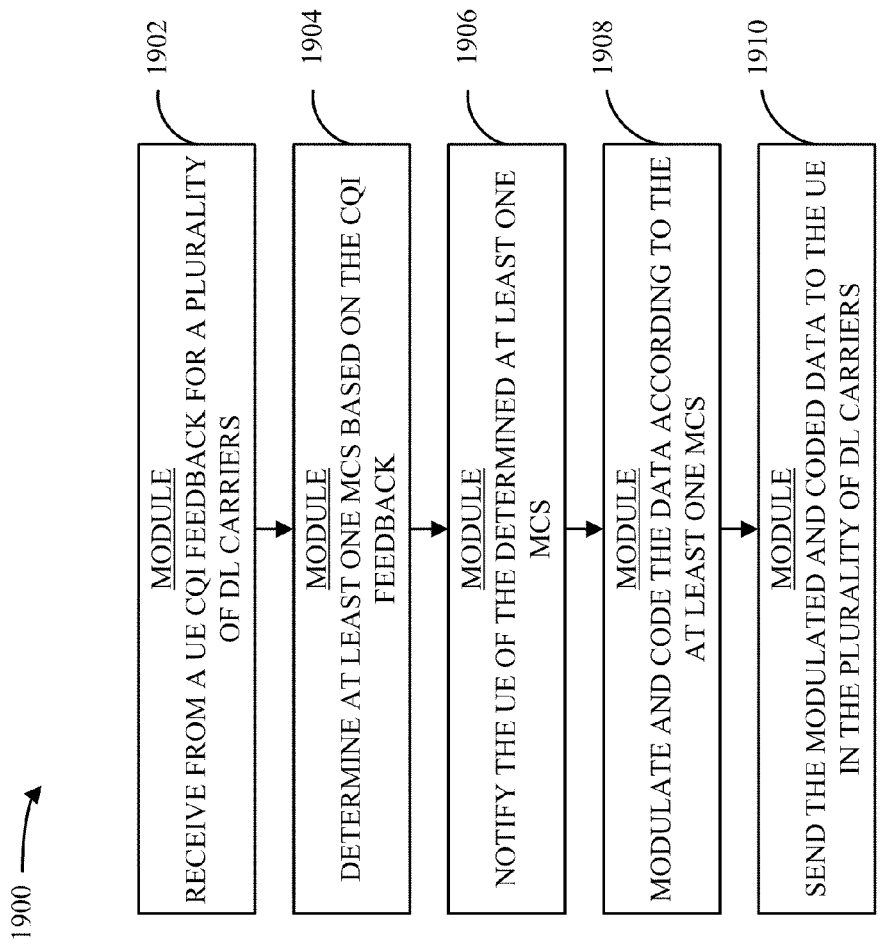
FIG. 19 is a conceptual block diagram illustrating the DL-related functionality of an exemplary BS apparatus.

FIG. 19 is a conceptual block diagram 1900 illustrating the DL-related functionality of a plurality of modules of an exemplary BS apparatus 400. A BS receives CQI feedback from a UE for a plurality of DL carriers (1902). The BS determines at least one MCS based on the CQI feedback (1904). The BS notifies the UE of the determined at least one MCS (1906). The BS modulates and codes the data according to the at least one MCS (1908). The BS then sends the modulated and coded data to the UE in the plurality of DL carriers (1910). In one configuration, an exemplary apparatus 400 includes means for determining at least one modulation and coding scheme based on feedback received for a plurality of downlink carriers and transmitted from a device, and means for modulating and coding data, according to the at least one modulation and coding scheme, for transmission to the device on the downlink carriers. The aforementioned means is the processing system configured with the modules/algorithm of FIG. 19.

Figure 20:
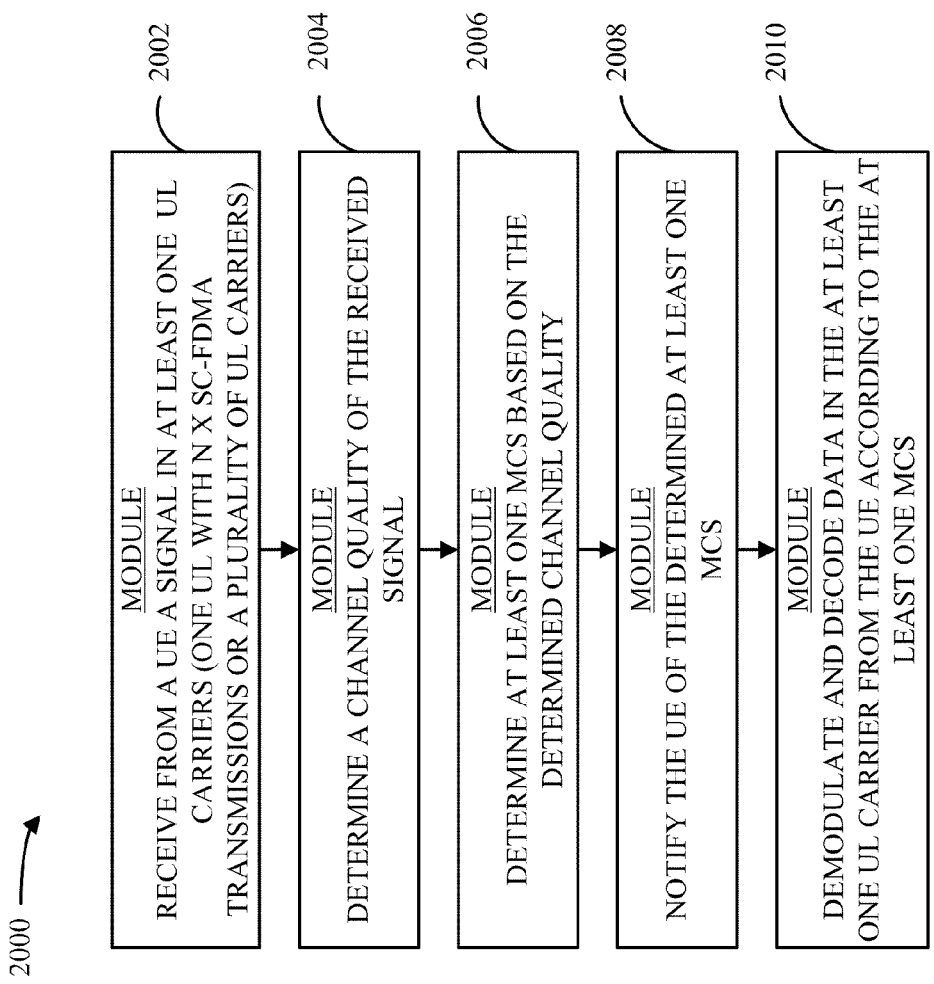
FIG. 20 is a conceptual block diagram illustrating the UL-related functionality of an exemplary BS apparatus.

FIG. 20 is a conceptual block diagram 2000 illustrating the UL-related functionality of a plurality of modules of an exemplary BS apparatus 400. A BS receives from a UE a signal in at least one UL carrier (2002). The at least one UL carrier may be one UL carrier with N×SC-FDMA transmissions or a plurality of UL carriers. The BS determines a channel quality of the received signal (2004). The BS determines at least one MCS based on the determined channel quality (2006). The BS notifies the UE of the determined at least one MCS (2008). The BS demodulates and decodes data in the least one UL carrier from the UE according to the at least one MCS (2010). In one configuration, an exemplary apparatus 400 includes means for receiving, from a device, a signal in at least one uplink carrier, the at least one uplink carrier comprising one selected from the group consisting of a plurality of uplink carriers and one uplink carrier containing N single-carrier frequency division multiple access transmissions, where $N \geq 2$; means for determining a channel quality of each received signal; means for determining at least one modulation and coding scheme based on the determined channel quality; and means for demodulating and decoding data in the at least one uplink carrier from the device according to the at least one modulation and coding scheme. The aforementioned means is the processing system configured with the modules/algorithm of FIG. 20.

Figure 21:
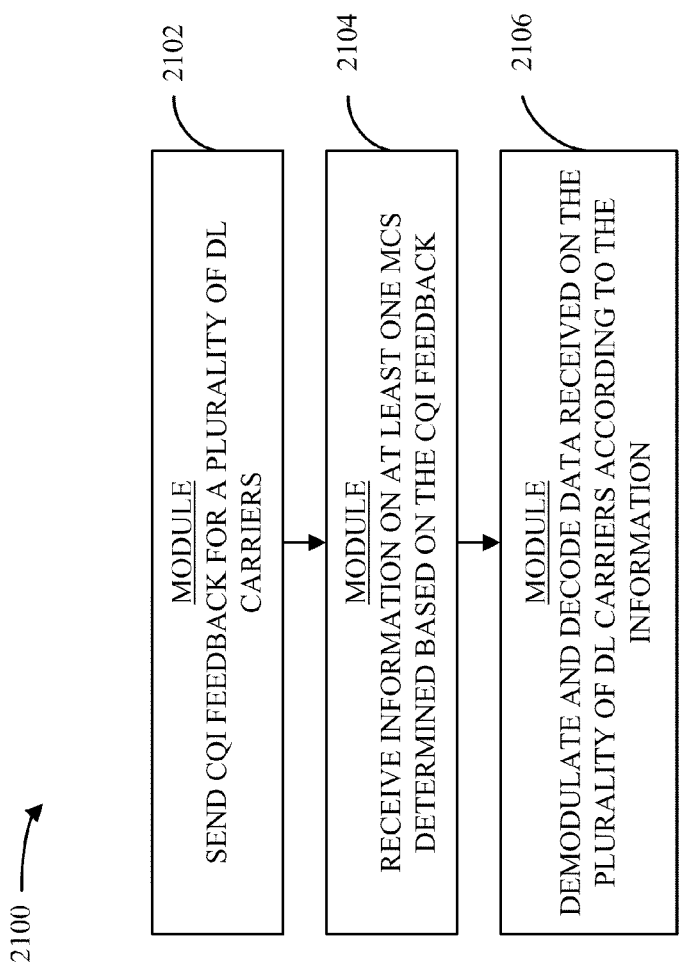
FIG. 21 is a conceptual block diagram illustrating the DL-related functionality of an exemplary UE apparatus.

FIG. 21 is a conceptual block diagram 2100 illustrating the DL-related functionality of a plurality of modules of an exemplary UE apparatus 400. A UE sends CQI feedback for a plurality of DL carriers (2102). The UE receives information on at least one MCS determined based on the CQI feedback (2104). The UE demodulates and decodes data received on the plurality of DL carriers according to the received information (2106). In one configuration, an exemplary apparatus 400 includes means for sending feedback for a plurality downlink carriers; means for receiving information on at least one modulation and coding scheme determined based on the feedback; and means for demodulating and decoding data received on the downlink carriers according to the information. The aforementioned means is the processing system configured with the modules/algorithm of FIG. 21.

Figure 22:
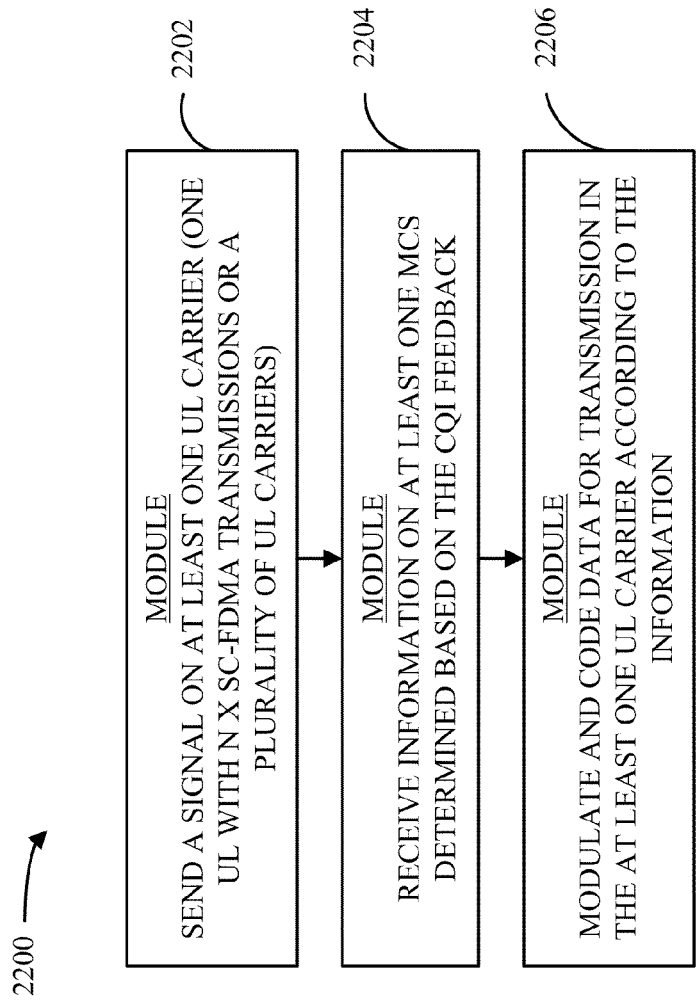
FIG. 22 is a conceptual block diagram illustrating the UL-related functionality of an exemplary UE apparatus.

FIG. 22 is a conceptual block diagram 2200 illustrating the UL-related functionality of a plurality of modules of an exemplary UE apparatus 400. A UE sends a signal on at least one UL carrier (2202). The at least one UL carrier may be one UL carrier with N×SC-FDMA transmissions or a plurality of UL carriers. The UE receives information on at least one MCS determined based on the CQI feedback (2204). The UE modulates and codes data for transmission in the at least one UL carrier according to the received information (2206). In one configuration, an exemplary apparatus 400 includes means for sending a signal on at least one uplink carrier, the at least one uplink carrier comprising one selected from the group consisting of a plurality of uplink carriers and one uplink carrier containing N single-carrier frequency division multiple access transmissions, where $N \geq 2$; means for receiving information on at least one modulation and coding scheme determined based on a channel quality of each signal; and means for modulating and coding data, for transmission in the at least one uplink carrier, according to the information. The aforementioned means is the processing system configured with the modules/algorithm of FIG. 22.

As discussed supra, multiple approaches for MSC over assigned resources in a multi-carrier system are provided. The multiple approaches include a common (single) MSC across multi-carrier allocation, a dedicated (separate) MCS per carrier allocation, a common MCS across a group of carriers, and a common MCS across multiple bandwidth allocations (e.g., N×SC-FDMA transmissions on a single UL carrier).

Common MCS provides a number of benefits. Under common MCS, there is a smaller DL grant overhead related to the MCS information. A single MC grant under a dedicated MCS approach would have additional bits (e.g., 5 bits) for notifying the UE of the separate MCS for each carrier, and if the grant is sent on each carrier separately, the grant would have additional bits (e.g., 25 bits) for MCS, flags, HARQ process ID, and CRC per carrier. In addition, the common MCS provides frequency diverse scheduling, as only a single wideband CQI feedback across all carriers is needed. That is, under the common MCS, the UE may send only one averaged CQI feedback for all DL carriers. Whereas under the dedicated MCS, which is frequency selective, the UE must send CQI feedback for each of the DL carriers. Furthermore, the common MCS provides potentially larger frequency diversity with a payload interleaved across allocated carriers.

Under common MCS, there is some capacity loss as compared to dedicated MCS. Under dedicated MCS, there is some capacity gain in case of a large SNR discrepancy between carriers, as the MCS is matched with the provided CQI feedback.

Common MCS across a group of carriers may allow flexibility to distinguish a group of carriers with very different characteristics. A number of MCSs per assignment may be limited to two and could cover the case of very large signal to interference plus noise ratio (SINR) discrepancy of two bandwidth regions due to different transmit power classes, interference, and losses in different frequency bands. A number of groups may be conveyed to a UE implicitly be the grant format. Information about which carriers belong to which group could be conveyed semi-statically to a UE either in system information or by RRC signaling (i.e., dedicated signaling). Alternatively, the information may be conveyed dynamically to the UE in the grant.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communication, comprising:
   determining at least one modulation and coding scheme based on feedback received for a plurality of downlink carriers and transmitted from a device;
   modulating and coding data, according to the at least one modulation and coding scheme, for transmission to the device on the downlink carriers, wherein the at least one modulation and coding scheme comprises a single modulation and coding scheme; and
   determining, for the data and for the single modulation and coding scheme, a number N of transport blocks and a size of each of the transport blocks,
   wherein the number N of transport blocks for the single modulation and coding scheme is determined as $N=\lceil T/T'\rceil$, where T is a first transport block size determined based on a first number of resource blocks $N_{RB}$ in a first transport block and an index of the single modulation and coding scheme, and T' is a second transport block size determined based on a second number of resource blocks $N'_{RB}$ in a second transport block and the index of the single modulation and coding scheme.

2. The method of claim 1, further comprising:
   notifying the device of the determined at least one modulation and coding scheme.

3. The method of claim 1, wherein the feedback is channel quality indication feedback.

4. The method of claim 1, wherein:
   the data comprises a first transport block and a second transport block multiplexed into a combined data block; and
   the method further comprises mapping the modulated and coded combined data block for transmission on the downlink carriers.

5. The method of claim 1, wherein the size of each of the N transport blocks is T' for the first N−1 transport blocks and T−(N−1)T' rounded up to a nearest second transport block size for the $N^{th}$ transport block.

6. The method of claim 1, wherein the size of each of the N transport blocks is T/N rounded up to a nearest second transport block size.

7. A method for wireless communication, comprising:
   determining at least one modulation and coding scheme based on feedback received for a plurality of downlink carriers and transmitted from a device; and
   modulating and coding data, according to the at least one modulation and coding scheme, for transmission to the device on the downlink carriers,
   wherein:
   the plurality of downlink carriers comprise a first downlink carrier and a second downlink carrier;
   the at least one modulation and coding scheme comprises a first modulation and coding scheme and a second modulation and coding scheme determined separately from the first modulation and coding scheme, the first modulation and coding scheme being determined based on said feedback received for the first downlink carrier and the second modulation and coding scheme being determined based on said feedback received for the second downlink carrier;
   the first modulation and coding scheme is used to modulate and code the data on the first downlink carrier; and
   the second modulation and coding scheme is used to modulate and code the data on the second downlink carrier.

8. The method of claim 7, wherein:
   the data comprises a first transport block and a second transport block;
   the first transport block is modulated and coded by the first modulation and coding scheme and the second transport block is modulated and coded by the second modulation and coding scheme; and
   the method further comprises mapping the modulated and coded first transport block for transmission on the first downlink carrier and mapping the modulated and coded second transport block for transmission on the second downlink carrier.

9. A method for wireless communication, comprising:
   determining at least one modulation and coding scheme based on feedback received for a plurality of downlink carriers and transmitted from a device; and
   modulating and coding data, according to the at least one modulation and coding scheme, for transmission to the device on the downlink carriers,
   wherein:
   the plurality of downlink carriers comprise a first downlink carrier, a second downlink carrier, and a third downlink carrier;
   the at least one modulation and coding scheme comprises a first modulation and coding scheme and a second modulation and coding scheme determined separately from the first modulation and coding scheme;
   the first modulation and coding scheme is used to modulate and code data on the first downlink carrier;
   the second modulation and coding scheme is used to modulate and code data on the third downlink carrier; and
   the first modulation and coding scheme or the second modulation and coding scheme is used to modulate and code data on the second downlink carrier.

10. The method of claim 9, wherein:
    the data comprises a first transport block and a second transport block multiplexed into a first combined data block and comprises a third transport block and a fourth transport block multiplexed into a second combined data block;
    the first combined data block is modulated and coded by the first modulation and coding scheme;
    the second combined data block is modulated and coded by the second modulation and coding scheme; and
    the method further comprises mapping the modulated and coded first combined data block for transmission on the first downlink carrier and the second downlink carrier, and mapping the modulated and coded second combined data block for transmission on the third downlink carrier.

11. The method of claim 9, wherein:
    the first modulation and coding scheme is used to modulate and code the data on the second downlink carrier;
    said feedback received for the first downlink carrier and said feedback received for the second downlink carrier are combined into a combined feedback, the combined feedback corresponding to an average channel quality of the first and second downlink carriers;

the first modulation and coding scheme is determined based on said combined feedback; and the second modulation and coding scheme is determined based on said feedback received for the third downlink carrier.

12. A method for wireless communication, comprising:

receiving, from a device, a signal in at least one uplink carrier, the at least one uplink carrier comprising one selected from the group consisting of a plurality of uplink carriers and one uplink carrier containing M single-carrier frequency division multiple access transmissions, where $M \geq 2$;

determining a channel quality of each received signal;

determining at least one modulation and coding scheme based on the determined channel quality; and demodulating and decoding data in the at least one uplink carrier from the device according to the at least one modulation and coding scheme, wherein the at least one modulation and coding scheme comprises a single modulation and coding scheme, and wherein a number N of transport blocks for the single modulation and coding scheme is determined as $N=\lceil T/T' \rceil$, where T is a first transport block size determined based on the first number of resource blocks $N_{RB}$ in a first transport block and an index of the single modulation and coding scheme, and T' is a second transport block size determined based on a second number of resource blocks $N'_{RB}$ in a second transport block and the index of the single modulation and coding scheme.

13. The method of claim 12, further comprising:

notifying the device of the determined at least one modulation and coding scheme.

14. A method for wireless communication, comprising:

receiving, from a device, a signal in a plurality of uplink carriers, the plurality of uplink carriers comprising at least one uplink carrier selected from the group consisting of a plurality of available uplink carriers and one uplink carrier containing N single-carrier frequency division multiple access transmissions, where $N \geq 2$;

determining a channel quality of each received signal;

determining at least one modulation and coding scheme based on the determined channel quality; and demodulating and decoding data in the plurality of uplink carriers from the device according to the at least one modulation and coding scheme, wherein:

the plurality of uplink carriers comprise a first uplink carrier and a second uplink carrier;

the at least one modulation and coding scheme comprises a first modulation and coding scheme and a second modulation and coding scheme determined separately from the first modulation and coding scheme, the first modulation and coding scheme being determined based on said channel quality for the first uplink carrier and the second modulation and coding scheme being determined based on said channel quality for the second uplink carrier;

the first modulation and coding scheme is used to modulate and code data on the first uplink carrier; and the second modulation and coding scheme is used to modulate and code data on the second uplink carrier.

15. A method for wireless communication, comprising:

receiving, from a device, a signal in a plurality of uplink carriers, the plurality of uplink carriers comprising at least one uplink carrier selected from the group consisting of a plurality of available uplink carriers and one uplink carrier containing N single-carrier frequency division multiple access transmissions, where $N \geq 2$;

determining a channel quality of each received signal;

determining at least one modulation and coding scheme based on the determined channel quality; and demodulating and decoding data in the plurality of uplink carriers from the device according to the at least one modulation and coding scheme, wherein:

the plurality of uplink carriers comprise a first uplink carrier, a second uplink carrier, and a third uplink carrier;

the at least one modulation and coding scheme comprises a first modulation and coding scheme and a second modulation and coding scheme determined separately from the first modulation and coding scheme;

the first modulation and coding scheme is used to modulate and code the data on the first uplink carrier;

the second modulation and coding scheme is used to modulate and code the data on the second uplink carrier; and the first modulation and coding scheme or the second modulation and coding scheme is used to modulate and code the data on the third uplink carrier.

16. A method for wireless communication, comprising:

receiving, from a device, a signal in at least one uplink carrier, the at least one uplink carrier comprising one selected from the group consisting of a plurality of uplink carriers and one uplink carrier containing N single-carrier frequency division multiple access transmissions, where $N \geq 2$;

determining a channel quality of each received signal;

determining at least one modulation and coding scheme based on the determined channel quality; and demodulating and decoding data in the at least one uplink carrier from the device according to the at least one modulation and coding scheme, wherein:

the at least one uplink carrier comprises one carrier containing said N single-carrier frequency division multiple access transmissions;

the at least one modulation and coding scheme comprises a single modulation and coding scheme;

the data comprises a first transport block and a second transport block;

the first and second transport blocks are modulated and coded by the single modulation and coding scheme; and the method further comprises mapping the modulated and coded first and second transport blocks for transmission on the N single-carrier frequency division multiple access transmissions.

17. A method for wireless communication, comprising:

sending feedback for a plurality downlink carriers;

receiving information on at least one modulation and coding scheme determined based on the feedback; and demodulating and decoding data received on the downlink carriers according to the information, wherein the at least one modulation and coding scheme comprises a single modulation and coding scheme, and wherein a number N of transport blocks for the single modulation and coding scheme is determined as $N=\lceil T/T' \rceil$, where T is a first transport block size determined based on a first number of resource blocks $N_{RB}$ in a first transport block and an index of the single modulation and coding scheme, and T' is a second transport block size determined based on a second number of resource blocks $N'_{RB}$ in a second transport block and the index of the single modulation and coding scheme.

18. The method of claim 17, wherein the feedback is channel quality indication feedback.

19. A method for wireless communication, comprising:
sending feedback for a plurality downlink carriers;
receiving information on at least one modulation and coding scheme determined based on the feedback; and
demodulating and decoding data received on the downlink carriers according to the information,
wherein:
the plurality of downlink carriers comprise a first downlink carrier and a second downlink carrier;
the at least one modulation and coding scheme comprises a first modulation and coding scheme and a second modulation and coding scheme determined separately from the first modulation and coding scheme, the first modulation and coding scheme being determined based on said feedback sent for the first downlink carrier and the second modulation and coding scheme being determined based on said feedback sent for the second downlink carrier;
the first modulation and coding scheme is used to demodulate and decode data on the first downlink carrier; and
the second modulation and coding scheme is used to demodulate and decode data on the second downlink carrier.

20. A method for wireless communication, comprising:
sending feedback for a plurality downlink carriers;
receiving information on at least one modulation and coding scheme determined based on the feedback; and
demodulating and decoding data received on the downlink carriers according to the information,
wherein:
the plurality of downlink carriers comprise a first downlink carrier, a second downlink carrier, and a third downlink carrier;
the at least one modulation and coding scheme comprises a first modulation and coding scheme and a second modulation and coding scheme determined separately from the first modulation and coding scheme, the first modulation and coding scheme being determined based on said feedback sent for the first downlink carrier and the second modulation and coding scheme being determined based on said feedback sent for the third downlink carrier;
the first modulation and coding scheme is used to demodulate and decode data on the first downlink carrier;
the second modulation and coding scheme is used to demodulate and decode data on the third downlink carrier; and
the first modulation and coding scheme or the second modulation and coding scheme is used to demodulate and decode data on the second downlink carrier.

21. A method for wireless communication, comprising:
sending a signal on at least one uplink carrier, the at least one uplink carrier comprising one selected from the group consisting of a plurality of uplink carriers and one uplink carrier containing M single-carrier frequency division multiple access transmissions, where $M \geq 2$;
receiving information on at least one modulation and coding scheme determined based on a channel quality of each signal; and
modulating and coding data, for transmission in the at least one uplink carrier, according to the information,
wherein the at least one modulation and coding scheme comprises a single modulation and coding scheme, and wherein a number N of transport blocks for the single modulation and coding scheme is determined as $N = \lceil T/T' \rceil$, where T is a first transport block size determined based on a first number of resource blocks $N_{RB}$ in a first transport block and an index of the single modulation and coding scheme, and T' is a second transport block size determined based on a second number of resource blocks $N'_{RB}$ in a second transport block and the index of the single modulation and coding scheme.

22. A method for wireless communication, comprising:
sending a signal on a plurality of uplink carriers, the plurality of uplink carriers comprising at least one uplink carrier selected from the group consisting of a plurality of available uplink carriers and one uplink carrier containing N single-carrier frequency division multiple access transmissions, where $N \geq 2$;
receiving information on at least one modulation and coding scheme determined based on a channel quality of each signal; and
modulating and coding data, for transmission in the plurality of uplink carriers, according to the information,
wherein:
the plurality of uplink carriers comprise a first uplink carrier and a second uplink carrier;
the at least one modulation and coding scheme comprises a first modulation and coding scheme and a second modulation and coding scheme determined separately from the first modulation and coding scheme, the first modulation and coding scheme being determined based on said channel quality for the first uplink carrier and the second modulation and coding scheme being determined based on said channel quality for the second uplink carrier;
the first modulation and coding scheme is used to modulate and code data on the first uplink carrier; and
the second modulation and coding scheme is used to modulate and code data on the second uplink carrier.

23. A method for wireless communication, comprising:
sending a signal on a plurality of uplink carriers, the plurality of uplink carriers comprising at least one uplink carrier selected from the group consisting of a plurality of available uplink carriers and one uplink carrier containing N single-carrier frequency division multiple access transmissions, where $N \geq 2$;
receiving information on at least one modulation and coding scheme determined based on a channel quality of each signal; and
modulating and coding data, for transmission in the plurality of uplink carriers, according to the information,
wherein:
the plurality of uplink carriers comprise a first uplink carrier, a second uplink carrier, and a third uplink carrier;
the at least one modulation and coding scheme comprises a first modulation and coding scheme and a second modulation and coding scheme determined separately from the first modulation and coding scheme;
the first modulation and coding scheme is used to modulate and code data on the first uplink carrier;
the second modulation and coding scheme is used to modulate and code data on the second uplink carrier; and
the first modulation and coding scheme or the second modulation and coding scheme is used to modulate and code data on the third uplink carrier.

24. An apparatus operable in a wireless communication system, comprising:
- means for determining at least one modulation and coding scheme based on feedback received for a plurality of downlink carriers and transmitted from a device;
- means for modulating and coding data, according to the at least one modulation and coding scheme, for transmission to the device on the downlink carriers, wherein the at least one modulation and coding scheme comprises a single modulation and coding scheme; and
- means for determining, for the data and for the single modulation and coding scheme, a number N of transport blocks and a size of each of the transport blocks,
- wherein the number N of transport blocks for the single modulation and coding scheme is determined as $N=\lceil T/T' \rceil$, where T is a first transport block size determined based on a first number of resource blocks $N_{RB}$ in a first transport block and an index of the single modulation and coding scheme, and T' is a second transport block size determined based on a second number of resource blocks $N'_{RB}$ in a second transport block and the index of the single modulation and coding scheme.

25. The apparatus of claim 24, further comprising:
- means for notifying the device of the determined at least one modulation and coding scheme.

26. The apparatus of claim 24, wherein the feedback is channel quality indication feedback.

27. The apparatus of claim 24, wherein:
- the data comprises a first transport block and a second transport block multiplexed into a combined data block; and
- the apparatus further comprises means for mapping the modulated and coded combined data block for transmission on the downlink carriers.

28. The apparatus of claim 24, wherein the size of each of the N transport blocks is T' for the first N−1 transport blocks and T−(N−1)T' rounded up to a nearest second transport block size for the $N^{th}$ transport block.

29. The apparatus of claim 24, wherein the size of each of the N transport blocks is T/N rounded up to a nearest second transport block size.

30. An apparatus operable in a wireless communication system, comprising:
- means for determining at least one modulation and coding scheme based on feedback received for a plurality of downlink carriers and transmitted from a device; and
- means for modulating and coding data, according to the at least one modulation and coding scheme, for transmission to the device on the downlink carriers,
- wherein:
- the plurality of downlink carriers comprise a first downlink carrier and a second downlink carrier;
- the at least one modulation and coding scheme comprises a first modulation and coding scheme and a second modulation and coding scheme determined separately from the first modulation and coding scheme, the first modulation and coding scheme being determined based on said feedback received for the first downlink carrier and the second modulation and coding scheme being determined based on said feedback received for the second downlink carrier;
- the first modulation and coding scheme is used to modulate and code data on the first downlink carrier; and
- the second modulation and coding scheme is used to modulate and code data on the second downlink carrier.

31. The apparatus of claim 30, wherein:
- the data comprises a first transport block and a second transport block;
- the first transport block is modulated and coded by the first modulation and coding scheme and the second transport block is modulated and coded by the second modulation and coding scheme; and
- the apparatus further comprises means for mapping the modulated and coded first transport block for transmission on the first downlink carrier and mapping the modulated and coded second transport block for transmission on the second downlink carrier.

32. An apparatus operable in a wireless communication system, comprising:
- means for determining at least one modulation and coding scheme based on feedback received for a plurality of downlink carriers and transmitted from a device; and
- means for modulating and coding data, according to the at least one modulation and coding scheme, for transmission to the device on the downlink carriers,
- wherein:
- the plurality of downlink carriers comprise a first downlink carrier, a second downlink carrier, and a third downlink carrier;
- the at least one modulation and coding scheme comprises a first modulation and coding scheme and a second modulation and coding scheme determined separately from the first modulation and coding scheme;
- the first modulation and coding scheme is used to modulate and code data on the first downlink carrier;
- the second modulation and coding scheme is used to modulate and code data on the third downlink carrier; and
- the first modulation and coding scheme or the second modulation and coding scheme is used to modulate and code data on the second downlink carrier.

33. The apparatus of claim 32, wherein:
- the data comprises a first transport block and a second transport block multiplexed into a first combined data block and comprises a third transport block and a fourth transport block multiplexed into a second combined data block;
- the first combined data block is modulated and coded by the first modulation and coding scheme;
- the second combined data block is modulated and coded by the second modulation and coding scheme; and
- the apparatus further comprises means for mapping the modulated and coded first combined data block for transmission on the first downlink carrier and the second downlink carrier, and mapping the modulated and coded second combined data block for transmission on the third downlink carrier.

34. The apparatus of claim 32, wherein:
- the first modulation and coding scheme is used to modulate and code the data on the second downlink carrier;
- said feedback received for the first downlink carrier and said feedback received for the second downlink carrier are combined into a combined feedback, the combined feedback corresponding to an average channel quality of the first and second downlink carriers;
- the first modulation and coding scheme is determined based on said combined feedback; and
- the second modulation and coding scheme is determined based on said feedback received for the third downlink carrier.

35. An apparatus for wireless communication, comprising:
- means for receiving, from a device, a signal in at least one uplink carrier, the at least one uplink carrier comprising one selected from the group consisting of a plurality of uplink carriers and one uplink carrier containing M single-carrier frequency division multiple access transmissions, where M≧2;

means for determining a channel quality of each received signal;

means for determining at least one modulation and coding scheme based on the determined channel quality; and means for demodulating and decoding data in the at least one uplink carrier from the device according to the at least one modulation and coding scheme, wherein the at least one modulation and coding scheme comprises a single modulation and coding scheme, and wherein a number N of transport blocks for the single modulation and coding scheme is determined as N=⌈T/T'⌉, where T is a first transport block size determined based on a first number of resource blocks $N_{RB}$ in a first transport block and an index of the single modulation and coding scheme, and T' is a second transport block size determined based on a second number of resource blocks $N'_{RB}$ in a second transport block and the index of the single modulation and coding scheme.

36. The apparatus of claim 35, further comprising:

means for notifying the device of the determined at least one modulation and coding scheme.

37. An apparatus for wireless communication, comprising:

means for receiving, from a device, a signal in a plurality of uplink carriers, the plurality of uplink carriers comprising at least one uplink carrier selected from the group consisting of a plurality of available uplink carriers and one uplink carrier containing N single-carrier frequency division multiple access transmissions, where N≧2;

means for determining a channel quality of each received signal;

means for determining at least one modulation and coding scheme based on the determined channel quality; and means for demodulating and decoding data in the plurality of uplink carriers from the device according to the at least one modulation and coding scheme, wherein:

the plurality of uplink carriers comprise a first uplink carrier and a second uplink carrier;

the at least one modulation and coding scheme comprises a first modulation and coding scheme and a second modulation and coding scheme determined separately from the first modulation and coding scheme, the first modulation and coding scheme being determined based on said channel quality for the first uplink carrier and the second modulation and coding scheme being determined based on said channel quality for the second uplink carrier;

the first modulation and coding scheme is used to modulate and code data on the first uplink carrier; and the second modulation and coding scheme is used to modulate and code data on the second uplink carrier.

38. An apparatus for wireless communication, comprising:

means for receiving, from a device, a signal in a plurality of uplink carriers, the plurality of uplink carriers comprising at least one uplink carrier selected from the group consisting of a plurality of available uplink carriers and one uplink carrier containing N single-carrier frequency division multiple access transmissions, where N≧2;

means for determining a channel quality of each received signal;

means for determining at least one modulation and coding scheme based on the determined channel quality; and means for demodulating and decoding data in the plurality of uplink carriers from the device according to the at least one modulation and coding scheme, wherein:

the plurality of uplink carriers comprise a first uplink carrier, a second uplink carrier, and a third uplink carrier;

the at least one modulation and coding scheme comprises a first modulation and coding scheme and a second modulation and coding scheme determined separately from the first modulation and coding scheme;

the first modulation and coding scheme is used to modulate and code data on the first uplink carrier;

the second modulation and coding scheme is used to modulate and code data on the second uplink carrier; and the first modulation and coding scheme or the second modulation and coding scheme is used to modulate and code data on the third uplink carrier.

39. An apparatus for wireless communication, comprising:

means for receiving, from a device, a signal in at least one uplink carrier, the at least one uplink carrier comprising one selected from the group consisting of a plurality of uplink carriers and one uplink carrier containing N single-carrier frequency division multiple access transmissions, where N≧2;

means for determining a channel quality of each received signal;

means for determining at least one modulation and coding scheme based on the determined channel quality; and means for demodulating and decoding data in the at least one uplink carrier from the device according to the at least one modulation and coding scheme, wherein:

the at least one uplink carrier comprises one carrier containing said N single-carrier frequency division multiple access transmissions;

the at least one modulation and coding scheme comprises a single modulation and coding scheme;

the data comprises a first transport block and a second transport block;

the first and second transport blocks are modulated and coded by the single modulation and coding scheme; and the apparatus further comprises means for mapping the modulated and coded first and second transport blocks for transmission on the N single-carrier frequency division multiple access transmissions.

40. An apparatus for wireless communication, comprising:

means for sending feedback for a plurality downlink carriers;

means for receiving information on at least one modulation and coding scheme determined based on the feedback; and means for demodulating and decoding data received on the downlink carriers according to the information, wherein the at least one modulation and coding scheme comprises a single modulation and coding scheme, and wherein a number N of transport blocks for the single modulation and coding scheme is determined as N=⌈T/T'⌉, where T is a first transport block size determined based on a first number of resource blocks $N_{RB}$ in a first transport block and an index of the single modulation and coding scheme, and T' is a second transport block size determined based on a second number of resource blocks $N'_{RB}$ in a second transport block and the index of the single modulation and coding scheme.

41. The apparatus of claim 40, wherein the feedback is channel quality indication feedback.

42. An apparatus for wireless communication, comprising:
means for sending feedback for a plurality downlink carriers;
means for receiving information on at least one modulation and coding scheme determined based on the feedback; and
means for demodulating and decoding data received on the downlink carriers according to the information,
wherein:
the plurality of downlink carriers comprise a first downlink carrier and a second downlink carrier;
the at least one modulation and coding scheme comprises a first modulation and coding scheme and a second modulation and coding scheme determined separately from the first modulation and coding scheme, the first modulation and coding scheme being determined based on said feedback sent for the first downlink carrier and the second modulation and coding scheme being determined based on said feedback sent for the second downlink carrier;
the first modulation and coding scheme is used to demodulate and decode data on the first downlink carrier; and
the second modulation and coding scheme is used to demodulate and decode data on the second downlink carrier.

43. An apparatus for wireless communication, comprising:
means for sending feedback for a plurality downlink carriers;
means for receiving information on at least one modulation and coding scheme determined based on the feedback; and
means for demodulating and decoding data received on the downlink carriers according to the information,
wherein:
the plurality of downlink carriers comprise a first downlink carrier, a second downlink carrier, and a third downlink carrier;
the at least one modulation and coding scheme comprises a first modulation and coding scheme and a second modulation and coding scheme determined separately from the first modulation and coding scheme, the first modulation and coding scheme being determined based on said feedback sent for the first downlink carrier and the second modulation and coding scheme being determined based on said feedback sent for the third downlink carrier;
the first modulation and coding scheme is used to demodulate and decode data on the first downlink carrier;
the second modulation and coding scheme is used to demodulate and decode data on the third downlink carrier; and
the first modulation and coding scheme or the second modulation and coding scheme is used to demodulate and decode data on the second downlink carrier.

44. An apparatus for wireless communication, comprising:
means for sending a signal on at least one uplink carrier, the at least one uplink carrier comprising one selected from the group consisting of a plurality of uplink carriers and one uplink carrier containing M single-carrier frequency division multiple access transmissions, where $M \geq 2$;
means for receiving information on at least one modulation and coding scheme determined based on a channel quality of each signal; and
means for modulating and coding data, for transmission in the at least one uplink carrier, according to the information,
wherein the at least one modulation and coding scheme comprises a single modulation and coding scheme, and
wherein a number N of transport blocks for the single modulation and coding scheme is determined as $N = \lceil T/T' \rceil$, where T is a first transport block size determined based on a first number of resource blocks $N_{RB}$ in a first transport block and an index of the single modulation and coding scheme, and T' is a second transport block size determined based on a second number of resource blocks $N'_{RB}$ in a second transport block and the index of the single modulation and coding scheme.

45. An apparatus for wireless communication, comprising:
means for sending a signal on a plurality of uplink carriers, the plurality of uplink carriers comprising at least one uplink carrier selected from the group consisting of a plurality of available uplink carriers and one uplink carrier containing N single-carrier frequency division multiple access transmissions, where $N \geq 2$;
means for receiving information on at least one modulation and coding scheme determined based on a channel quality of each signal; and
means for modulating and coding data, for transmission in the plurality of uplink carriers, according to the information,
wherein:
the plurality of uplink carriers comprise a first uplink carrier and a second uplink carrier;
the at least one modulation and coding scheme comprises a first modulation and coding scheme and a second modulation and coding scheme determined separately from the first modulation and coding scheme, the first modulation and coding scheme being determined based on said channel quality for the first uplink carrier and the second modulation and coding scheme being determined based on said channel quality for the second uplink carrier;
the first modulation and coding scheme is used to modulate and code data on the first uplink carrier; and
the second modulation and coding scheme is used to modulate and code data on the second uplink carrier.

46. An apparatus for wireless communication, comprising:
means for sending a signal on a plurality of uplink carriers, the plurality of uplink carriers comprising at least one uplink carrier selected from the group consisting of a plurality of available uplink carriers and one uplink carrier containing N single-carrier frequency division multiple access transmissions, where $N \geq 2$;
means for receiving information on at least one modulation and coding scheme determined based on a channel quality of each signal; and
means for modulating and coding data, for transmission in the plurality of uplink carriers, according to the information,
wherein:
the plurality of uplink carriers comprise a first uplink carrier, a second uplink carrier, and a third uplink carrier;
the at least one modulation and coding scheme comprises a first modulation and coding scheme and a second modulation and coding scheme determined separately from the first modulation and coding scheme;
the first modulation and coding scheme is used to modulate and code data on the first uplink carrier;
the second modulation and coding scheme is used to modulate and code data on the second uplink carrier; and
the first modulation and coding scheme or the second modulation and coding scheme is used to modulate and code data on the third uplink carrier.

47. A computer program product, comprising:
a non-transitory computer-readable medium, comprising:
code for determining at least one modulation and coding scheme based on feedback received for a plurality of downlink carriers and transmitted from a device; and
code for modulating and coding data, according to the at least one modulation and coding scheme, for transmission to the device on the downlink carriers,
wherein:
the plurality of downlink carriers comprise a first downlink carrier and a second downlink carrier;
the at least one modulation and coding scheme comprises a first modulation and coding scheme and a second modulation and coding scheme determined separately from the first modulation and coding scheme, the first modulation and coding scheme being determined based on said feedback received for the first downlink carrier and the second modulation and coding scheme being determined based on said feedback received for the second downlink carrier;
the first modulation and coding scheme is used to modulate and code data on the first downlink carrier; and
the second modulation and coding scheme is used to modulate and code data on the second downlink carrier.

48. A computer program product, comprising:
a non-transitory computer-readable medium, comprising:
code for receiving, from a device, a signal in a plurality of uplink carriers, the plurality of uplink carriers comprising at least one uplink carrier selected from the group consisting of a plurality of available uplink carriers and one uplink carrier containing N single-carrier frequency division multiple access transmissions, where N≧2;
code for determining a channel quality of each received signal;
code for determining at least one modulation and coding scheme based on the determined channel quality; and
code for demodulating and decoding data in the plurality of uplink carriers from the device according to the at least one modulation and coding scheme,
wherein:
the plurality of uplink carriers comprise a first uplink carrier and a second uplink carrier;
the at least one modulation and coding scheme comprises a first modulation and coding scheme and a second modulation and coding scheme determined separately from the first modulation and coding scheme, the first modulation and coding scheme being determined based on said channel quality for the first uplink carrier and the second modulation and coding scheme being determined based on said channel quality for the second uplink carrier;
the first modulation and coding scheme is used to modulate and code data on the first uplink carrier; and
the second modulation and coding scheme is used to modulate and code data on the second uplink carrier.

49. A computer program product, comprising:
a non-transitory computer-readable medium, comprising:
code for sending feedback for a plurality downlink carriers;
code for receiving information on at least one modulation and coding scheme determined based on the feedback; and
code for demodulating and decoding data received on the downlink carriers according to the information,
wherein:
the plurality of downlink carriers comprise a first downlink carrier and a second downlink carrier;
the at least one modulation and coding scheme comprises a first modulation and coding scheme and a second modulation and coding scheme determined separately from the first modulation and coding scheme, the first modulation and coding scheme being determined based on said feedback sent for the first downlink carrier and the second modulation and coding scheme being determined based on said feedback sent for the second downlink carrier;
the first modulation and coding scheme is used to demodulate and decode data on the first downlink carrier; and
the second modulation and coding scheme is used to demodulate and decode data on the second downlink carrier.

50. A computer program product, comprising:
a non-transitory computer-readable medium, comprising:
code for sending a signal on a plurality of uplink carriers, the plurality of uplink carriers comprising at least one uplink carrier selected from the group consisting of a plurality of available uplink carriers and one uplink carrier containing N single-carrier frequency division multiple access transmissions, where N≧2;
code for receiving information on at least one modulation and coding scheme determined based on a channel quality of each signal; and
code for modulating and coding data, for transmission in the plurality of uplink carriers, according to the information,
wherein:
the plurality of uplink carriers comprise a first uplink carrier and a second uplink carrier;
the at least one modulation and coding scheme comprises a first modulation and coding scheme and a second modulation and coding scheme determined separately from the first modulation and coding scheme, the first modulation and coding scheme being determined based on said channel quality for the first uplink carrier and the second modulation and coding scheme being determined based on said channel quality for the second uplink carrier;
the first modulation and coding scheme is used to modulate and code data on the first uplink carrier; and
the second modulation and coding scheme is used to modulate and code data on the second uplink carrier.

51. An apparatus for wireless communication, comprising:
a processing system configured to:
determine at least one modulation and coding scheme based on feedback received for a plurality of downlink carriers and transmitted from a device; and
modulate and code data, according to the at least one modulation and coding scheme, for transmission to the device on the downlink carriers,
wherein:
the plurality of downlink carriers comprise a first downlink carrier and a second downlink carrier;
the at least one modulation and coding scheme comprises a first modulation and coding scheme and a second modulation and coding scheme determined separately from the first modulation and coding scheme, the first modulation and coding scheme being determined based on said feedback received for the first downlink carrier and the second modulation and coding scheme being determined based on said feedback received for the second downlink carrier;
the first modulation and coding scheme is used to modulate and code data on the first downlink carrier; and the second modulation and coding scheme is used to modulate and code data on the second downlink carrier.

52. An apparatus for wireless communication, comprising:

a processing system configured to:

receive, from a device, a signal in a plurality of uplink carriers, the plurality of uplink carriers comprising at least one uplink carrier selected from the group consisting of a plurality of available uplink carriers and one uplink carrier containing N single-carrier frequency division multiple access transmissions, where $N \geq 2$;

determine a channel quality of each received signal;

determine at least one modulation and coding scheme based on the determined channel quality; and demodulate and decode data in the plurality of uplink carriers from the device according to the at least one modulation and coding scheme, wherein:

the plurality of uplink carriers comprise a first uplink carrier and a second uplink carrier;

the at least one modulation and coding scheme comprises a first modulation and coding scheme and a second modulation and coding scheme determined separately from the first modulation and coding scheme, the first modulation and coding scheme being determined based on said channel quality for the first uplink carrier and the second modulation and coding scheme being determined based on said channel quality for the second uplink carrier;

the first modulation and coding scheme is used to modulate and code data on the first uplink carrier; and the second modulation and coding scheme is used to modulate and code data on the second uplink carrier.

53. An apparatus for wireless communication, comprising:

a processing system configured to:

send feedback for a plurality downlink carriers;

receive information on at least one modulation and coding scheme determined based on the feedback; and demodulate and decode data received on the downlink carriers according to the information, the plurality of downlink carriers comprise a first downlink carrier and a second downlink carrier;

the at least one modulation and coding scheme comprises a first modulation and coding scheme and a second modulation and coding scheme determined separately from the first modulation and coding scheme, the first modulation and coding scheme being determined based on said feedback sent for the first downlink carrier and the second modulation and coding scheme being determined based on said feedback sent for the second downlink carrier;

the first modulation and coding scheme is used to demodulate and decode data on the first downlink carrier; and the second modulation and coding scheme is used to demodulate and decode data on the second downlink carrier.

54. An apparatus for wireless communication, comprising:

a processing system configured to:

send a signal on a plurality of uplink carriers, the plurality of uplink carriers comprising at least one uplink carrier selected from the group consisting of a plurality of available uplink carriers and one uplink carrier containing N single-carrier frequency division multiple access transmissions, where $N \geq 2$;

receive information on at least one modulation and coding scheme determined based on a channel quality of each signal; and modulate and code data, for transmission in the plurality of uplink carriers, according to the information, wherein:

the plurality of uplink carriers comprise a first uplink carrier and a second uplink carrier;

the at least one modulation and coding scheme comprises a first modulation and coding scheme and a second modulation and coding scheme determined separately from the first modulation and coding scheme, the first modulation and coding scheme being determined based on said channel quality for the first uplink carrier and the second modulation and coding scheme being determined based on said channel quality for the second uplink carrier;

the first modulation and coding scheme is used to modulate and code data on the first uplink carrier; and the second modulation and coding scheme is used to modulate and code data on the second uplink carrier.

* * * * *